United States Patent
Jiang

(10) Patent No.: US 9,692,892 B2
(45) Date of Patent: Jun. 27, 2017

(54) TRADING EXCHANGE FOR LOCAL DATA SERVICES

(71) Applicant: GLOBETOUCH, INC., Santa Clara, CA (US)

(72) Inventor: John Yue Jiang, Danville, CA (US)

(73) Assignee: GLOBETOUCH, INC., Santa Clara, CA (US)

( * ) Notice: Subject to any disclaimer, the term of this patent is extended or adjusted under 35 U.S.C. 154(b) by 0 days.

(21) Appl. No.: 14/862,051

(22) Filed: Sep. 22, 2015

(65) Prior Publication Data

US 2016/0088459 A1    Mar. 24, 2016

Related U.S. Application Data

(60) Provisional application No. 62/053,677, filed on Sep. 22, 2014, provisional application No. 62/053,673, (Continued)

(51) Int. Cl.
*H04M 11/00* (2006.01)
*H04M 3/487* (2006.01)
(Continued)

(52) U.S. Cl.
CPC ...... *H04M 3/4878* (2013.01); *H04L 12/1407* (2013.01); *H04M 15/51* (2013.01);
(Continued)

(58) Field of Classification Search
CPC .. H04M 3/4878; H04M 15/31; H04M 17/207; H04W 8/12; H04W 8/08;
(Continued)

(56) References Cited

U.S. PATENT DOCUMENTS

2005/0070278 A1*  3/2005  Jiang ............... H04W 8/183
                                                           455/432.3
2007/0281687 A1   12/2007  Jiang
(Continued)

FOREIGN PATENT DOCUMENTS

WO    WO 00/69180 A2    11/2000
WO    WO 2012/064980 A1    5/2012
WO    WO 2014/033534 A2    3/2014

OTHER PUBLICATIONS

International Search Report of PCT/US2015/051409 dated Dec. 14, 2015.

(Continued)

*Primary Examiner* — Tanmay Shah
(74) *Attorney, Agent, or Firm* — Arent Fox LLP

(57) ABSTRACT

The present invention provides a method and system for trading exchange to facilitate local data services for roaming users. The trading exchange includes an ecosystem of a plurality of operators, having home network (HPMN) and visited network (VPMN) operators. The trading exchange further includes a gateway for facilitating local data services for users, where the user is roaming in VPMN, by configuring a Domane Name Resolution (DNS) of the VPMN's Gateway General Packet Radio System (GPRS) Support Node (GGSN) for its users. The trading exchange further includes an interface maintaining a bi-directional connection with the gateway to exchange information related to the roaming services, and a bi-directional connection with users via their mobile devices' user interface.

30 Claims, 14 Drawing Sheets

Related U.S. Application Data filed on Sep. 22, 2014, provisional application No. 62/157,316, filed on May 5, 2015.

(51) Int. Cl.
| | |
|---|---|
| H04W 8/08 | (2009.01) |
| H04W 8/12 | (2009.01) |
| H04L 12/14 | (2006.01) |
| H04M 15/00 | (2006.01) |
| H04W 88/16 | (2009.01) |
| H04W 88/08 | (2009.01) |
| H04L 29/12 | (2006.01) |
| H04W 60/00 | (2009.01) |
| H04L 12/24 | (2006.01) |

(52) U.S. Cl.
CPC ......... *H04M 15/54* (2013.01); *H04M 15/805* (2013.01); *H04M 15/8214* (2013.01); *H04W 8/08* (2013.01); *H04W 8/12* (2013.01); *H04L 12/1417* (2013.01); *H04L 12/1435* (2013.01); *H04L 12/1457* (2013.01); *H04L 12/1467* (2013.01); *H04L 12/1492* (2013.01); *H04L 41/18* (2013.01); *H04L 61/1511* (2013.01); *H04M 15/31* (2013.01); *H04M 15/8038* (2013.01); *H04W 60/00* (2013.01); *H04W 88/08* (2013.01); *H04W 88/16* (2013.01)

(58) Field of Classification Search
CPC ..... H04W 60/00; H04W 88/08; H04W 88/16; H04L 61/1511
USPC ........................................................ 455/406
See application file for complete search history.

(56) References Cited

U.S. PATENT DOCUMENTS

| | | | | |
|---|---|---|---|---|
| 2008/0125116 | A1* | 5/2008 | Jiang | H04W 8/06 455/433 |
| 2009/0082019 | A1* | 3/2009 | Marsico | H04W 48/18 455/435.2 |
| 2010/0105378 | A1 | 4/2010 | Shi et al. | |
| 2010/0128685 | A1* | 5/2010 | Jiang | H04W 8/12 370/329 |
| 2010/0272063 | A1 | 10/2010 | Kato et al. | |
| 2011/0225086 | A1* | 9/2011 | Ibasco | G06Q 20/102 705/40 |
| 2011/0258064 | A1 | 10/2011 | Agarwal et al. | |
| 2012/0087274 | A1* | 4/2012 | Meriau | H04W 4/00 370/253 |
| 2012/0108206 | A1* | 5/2012 | Haggerty | H04W 12/06 455/411 |
| 2012/0220330 | A1* | 8/2012 | Goldner | H04L 12/1407 455/517 |
| 2012/0327787 | A1 | 12/2012 | Mohammed et al. | |
| 2014/0094159 | A1 | 4/2014 | Raleigh et al. | |
| 2014/0248959 | A1* | 9/2014 | Jabara | G07F 17/3218 463/42 |

OTHER PUBLICATIONS

3GPP TS 09.02 v7.9.0 (Jun. 2001); 3rd Generation Partnership Project; Technical Specification Group Core Network; Digital cellular telecommunications system (Phase 2+); Moble Application Part (MAP) specification (Release 1998).
ETSI TS 100 901 v7.4.0 (Dec. 1999); Digital cellular telecommunications system (Phase 2+); Technical realization of teh Short Message Service (SMS); (GSM 03.40 version 7.4.0 Release 1998).
ETSI TS 101 045 v6.2.0 (Nov. 1999); Digital cellular telecommunications system (Phase 2+); Support of Optimal Routeing (SOR); Technical realisation (GSM 03.79 version 6.2.0 Release 1997).
ETSI TS 101 046 v7.0.0 (Aug. 1999); Digital cellular telecommunications system (Phase 2+); Customised Applications for Mobile network Enhanced Logic (CAMEL); CAMEL Application Part (CAP) specification (GSM 09.78 version 7.0.0 Release 1998).
GSM 03.78; tdoc SMG 048/97; Digital cellular teclecommunications system (Phase 2+); Customised Applications for Mobile network Enhanced Logic (CAMEL) (GSM 03.78); ETSI TC SMG, Paris, France, Feb. 10-14, 1997.
ITU-T Q.1214 (Oct. 1995); Intelligent Network; Distributed Functional Plane for Intelligent Network CS-1; ITU-T Recommendation Q.1214.
ITU-T Q.1218 (Oct. 1995); Intelligent Network; Interface Recommendation for Intelligent Network CS-1; ITU-T Recommendation Q.1218.
ITU-T Q.762 (Dec. 1999); Series Q: Switching and Signalling Specifications of Signalling System No. 7—ISDN user part; ITU-T Recommendation Q.762.
ITU-T Q.763 (Dec. 1999); Series Q: Switching and Signalling Specifications of Signalling System No. 7—ISDN user part; Signalling System No. 7—ISDN user part formats and codes; ITU-T Recommendation Q.763.
ITU-T Q.765 (May 1998); Series Q: Switching and Signalling ; Specifications of Signalling System No. 7—ISDN user part; Signalling system No. 7—Application transport mechanism; ITU-T Recommendation Q.765.
ITU-T Q.766 (Mar. 1993); Specifications of Signalling System No. 7 ISDN User Part; Performance Objectives in the Integrated Services Digital Network Application; ITU-T Recommendation Q.766.
ITU-T Q.769.1 (Dec. 1999); Series Q: Switching and Signalling; Specifications of Signalling System No. 7—ISDN user part; Signalling system No. 7—ISDN user part enhancements for the support of number portability; ITU-T Recommendation Q.769,1.
ITU-T Q764; Series Q: Switching and Signalling Specifications of Signalling System No. 7—ISDN user part; Signalling system No. 7—ISDN user part signalling procedures; ITU-T Recommendation Q.764.
TS 101 043 v6.1.0 (Aug. 1998); Digital cellular telecommunications system (Phase 2+); Basic call handling; Technical realization (GSM 03.18 version 6.1.0 Release 1997).

\* cited by examiner

Auto sell of un-used local data service plan

☐ Auto Sell Unused Package

Checkbox

○ Detected Back home
○ Detected in another country
○ Based Usage rate so far

Radiobox

TRADING EXCHANGE FOR LOCAL DATA SERVICES

RELATED APPLICATIONS

This application claims priority to U.S. Provisional Pat. Appl. No. 62/053,677 entitled "Global Trading Place for Communication Based Services, Traveling Services and Commerce (without APN change)," filed on Sep. 22, 2014; U.S. Provisional Pat. Appl. No. 62/053,673 entitled "Global Trading Place for Communication Based Services, Traveling Services and Commerce (with APN change)," filed on Sep. 22, 2014; and U.S. Provisional Pat. Appl. No. 62/157, 316 entitled "Global Trading Place for Communication Based Services, Traveling Services and Commerce (Data-X)," filed on May 5, 2015. The aforementioned patent applications are incorporated herein by this reference in their entirety.

FIELD OF THE INVENTION

The present invention generally relates to mobile communication. More specifically, the invention relates to enabling local data services while roaming.

BACKGROUND OF THE INVENTION

Roaming traffic contributes a significant percentage of an operator's revenue and even a better percentage of the operator's margin. With increasing competition and regulatory control, operators are being more pressured to increase their roaming revenue. As the global mobile roaming market business model is evolving, the industry understands the strategic importance of roaming to operator's revenues and profit margins and is adapting various newly proposed regulations. The operators understand that they must develop strategies for driving the number of roamers and roaming usage, while lowering tariff rates. Mostly, the roaming revenue is contributed by voice calls based revenue and less revenue contribution is due to data services. Around 70% of global mobile data users do not use data services when on roaming. Hence, data roaming is currently underutilized by a factor of 25 times despite significant uptake with much reduced retail pricing and 10% increase of data roamers.

This situation would is exacerbated with the increasing adoption of smartphone and 4 G technologies. Data roaming is still the primary source of customer complaints and comprehension as it is difficult to count volume of data usage on smartphone applications given the variety of the background running usage; while voice and messaging can be easily controlled and understood by the customers via CDRs.

Gone are the days when data usage used to be a luxury option. Now, it is a necessity of everyday use of mobile phone. In fact, it is the essence of keeping in touch these days given the popular adoption of social media platforms. It is also an increasingly important source of exchanging valuable information and conducting e-commerce.

In accordance with the foregoing, there is a need in the art of a system, a method, for creating a solution that gives an operator the ways to leverage the ecosystem of partnering operators to enable a user use data services while roaming, at competitive rates, with the aim of simplifying user's experience and maximizing roaming revenue for participating operators.

SUMMARY

The present invention is directed towards a trading exchange system where an ecosystem of operators having at least one VPMN and at least one HPMN are connected to a gateway/exchange that facilitates local data services for users. These users are roaming in the VPMN. The local data services are facilitated by configuring a Domain Name Resolution (DNS) of VPMN's GGSN for its users. The trading exchange systems also includes an interface that maintains a bi-directional connection with the gateway to exchange information related to the roaming services, and a bi-directional connection with users via their mobile devices' user interface.

The present invention is also directed towards providing a method for facilitating local data services for the users. The gateway/exchange receive a location update message of the users. The gateway is connected to the ecosystem of operators, having at least one VPMN and at least one HPMN. The gateway configuring DNS of VPMN's GGSN of its users who are roaming in the VPMN, wherein the DNS is configured using an interface that maintains a bi-directional connection with the gateway and users' mobile devices' user interface.

BRIEF DESCRIPTION OF DRAWINGS

In the drawings, the same or similar reference numbers identify similar elements or acts.

DETAILED DESCRIPTION

In the following description, for purposes of explanation, specific numbers, materials and configurations are set forth in order to provide a thorough understanding of the present invention. It will be apparent, however, to one having ordinary skill in the art that the present invention may be practiced without these specific details. In some instances, well-known features may be omitted or simplified, so as not to obscure the present invention. Furthermore, reference in the specification to "one embodiment" or "an embodiment" means that a particular feature, structure or characteristic, described in connection with the embodiment, is included in at least one embodiment of the present invention. The appearance of the phrase "in an embodiment", in various places in the specification, does not necessarily refer to the same embodiment.

The present invention provides a system and a method for facilitating local data services for a user of a Home Public Mobile Network (HPMN) roaming in a Visited Public Mobile Network (VPMN). In accordance with various embodiments, the present invention provides a method and system providing the user a facility to use data services even while roaming but charged at local rates.

Figure 1:
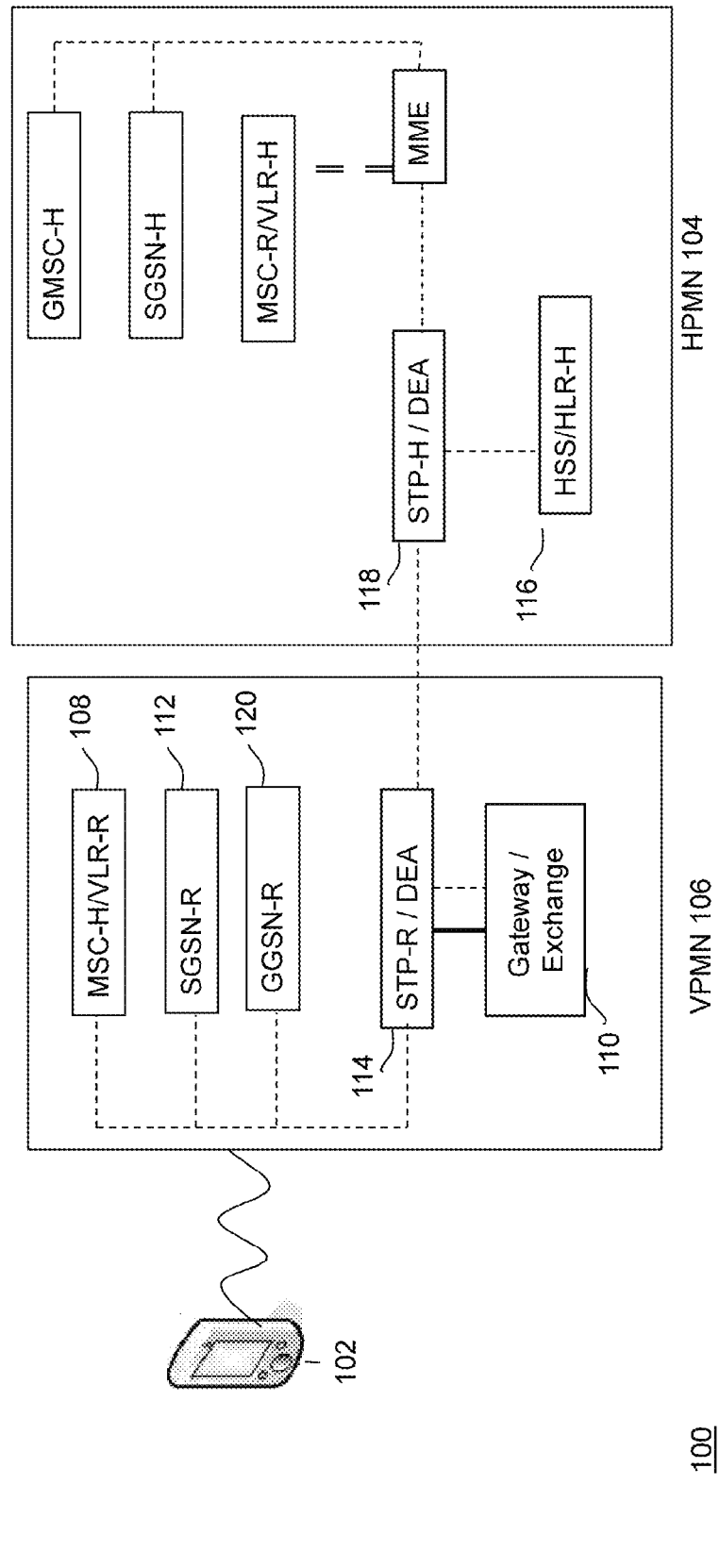
FIG. 1 illustrates a system for implementing trading exchange for local data service, in accordance with an embodiment of the present invention.

FIG. 1 illustrates a system 100 for facilitating the local data service for roaming users, in accordance with an embodiment of the present invention. A user 102 of HPMN 104 (from home country) is roaming in a VPMN 106 (from visiting country). The user 102 is connected to a VPMN VLR 108, when it is roaming outside HPMN 102. The system 100 includes a gateway 110, hereinafter, interchangeably referred to as trading exchange 110 or communication exchange 110 or just exchange that facilitates local data services for user 102 while in VPMN 106, in accordance with various embodiments of the present invention. The user 102 uses a smartphone device that has a provision to have a software interface/software application that helps in maintaining a bi-directional connection with gateway 110 to exchange information related to the roaming services, and a bi-directional connection with user 102 via his/her mobile devices' user interface. For sake of representation only two operators (HPMN and VPMN) are shown, however, in various embodiments of the present invention, exchange 110 works with an ecosystem that has multiple operators (HPMNs and VPMNs), who would like their subscribers to use this facility of local data services.

In one embodiment of the invention, VPMN VLR 108 is connected with an SGSN-R 112, which is further connected with STP-R/DEA 114, via SS7 protocol. The exchange 110 is connected with STP-R/DEA 114 via IP in monitoring mode. User profile data corresponding to user 102 is stored in HPMN HLR-H 116. The signaling corresponding to user 102 is routed using STP-H 118. The key component of VPMN 106 is it's GGSN-R 120, which configures it's DNS to resolve all international roamers' home destined APNs to GGSN/Packet Data Network Gateway (PGW) of the gateway 110. This configuration allows the VPMN to enable local data services for roaming user 102, without having to modify this APN profile. The signaling between HPMN 104 and VPMN 106 is carried using SS7 signaling architecture. The signals exchanged between HPMN 104 and VPMN 106 are MAP based signals.

For sake of representation, system 100 represents network elements from both LTE and GSM networks. HPMN 104 including HSS/HLR-H 116 connects via a STP-H/DEA 118 to an MME, which is further connected to an MSC-R/VLR-H in HPMN 104 via BSSAP+ protocol. These network elements communicate with each other over a Signaling System 7 (SS7) link.

It will also be apparent to a person skilled in the art that HPMN 104 and VPMN 108 may also include various other network components (not shown in FIG. 1), depending on the architecture under consideration. It will also be apparent to a person skilled in the art that various components of HPMN 104 communicate with VPMN 106 using various signaling techniques including, but not limited to, SS7, SIP, IP, ISUP etc.

In accordance with various embodiments of the present invention, the exchange 110 is a B2B2C cloud-based electronic trading service that is built on an clearing exchange with an ecosystem of mobile operators (considered as merchants) that allows users such as user 102 through a software front end interface (without requiring them to change their mobile device and/or SIM) to sell and buy a local rate data package for use of a roaming or local device in a mobile operator of the ecosystem. In addition to cross operator trading between users of different networks, the users of a joining operator can even buy and sell local rate data packages in the same network. This electronic market place simplifies the user experience by enabling a pure smartphone (such as, but not limited to iOS based devices, Android based devices) application interface for the trading service.

In accordance with various embodiments of the present invention, the exchange 110 provides a seamless experience to user 102. A roaming user or a local user with a smartphone (as defined above) with an unchanged HPMN 104's SIM using an application downloaded from an application store registers an account with the trading service, provided by exchange 110. Now, through this application, the user 102 can buy a local rate data package offered by a local mobile operator with a stored wallet or a payment method. In accordance with several embodiments of the present invention, the interface enables payments related to sale or purchase of data packages, using at least one of mobile wallet, PayPal, Credit Cards, Debit Card, wire transfers, NFC payments, WePay, Alipay, Pay™, and online payment systems. Once the user 102 has bought a data package, the data package can be activated on a scheduled time, on registration automatically or on demand manually. The user 102 may also manually select the mobile operator (via the application the application or via the user's mobile interface) or the user 102's phone is automatically steered to the desired mobile operator.

An enterprise service administrator (local or international) using the software interface (i.e., the application on user's mobile or a web interface or just a desktop client) registers an account with the trading service and can then buy an individual or group local rate data package on the trading platform for an individual or group of mobile devices (such as a company's employee group, M2M and Internet Of Things) the enterprise manages. Once a device is part of a bought package, the device's local usage can be activated on a scheduled time, on registration automatically or on demand remotely over the air. The device may also be configured for the selected mobile operator remotely over the air or be automatically steered to the mobile operator. Individual device's usage and monetary spending can also be controlled by the administrator.

User 102 with a smartphone with an unchanged home operator SIM using an application on his smartphone registers an account with the trading service. Now through the application, user 102 can sell a portion of his unused local rate data package bought on the trading platform to another roaming traveler. The application informs the user how much data used so far and how much data is unused on its current data plan. Once the portion is sold, the user would be credited with the money in its stored wallet.

A mobile operator using the interface registers an account with the communication exchange 100/trading service, and can price and sell a local rate data package for one or more devices on the trading platform. Once the portion of package is sold, the operator account would be credited with the money in its stored wallet. The buyer could be a roaming user or an international enterprise.

An enterprise service administrator using the interface registers an account with trading service 110 and can sell a portion of the enterprise's unused local rate data package bought on the trading platform. The software interface informs the administrator on usage of the data. Once the portion of data package is sold, the enterprise account would be credited with the money in its stored wallet. The buyer could be a local user or a roaming user or an enterprise.

It will be apparent to a person skilled in the art that the trading service 110 of local rate data plan can used by roaming devices between operators of national roaming and international roaming. In other words, a user cannot buy local data packages from its own operator from the trading service 110. Moreover, an operator merchant normally only sells data packages although there is no system restriction for the merchant to buy data packages as an enterprise too. However, non-operator merchant seller is restricted to sell only data packages that are bought via the trading service.

Figure 2:
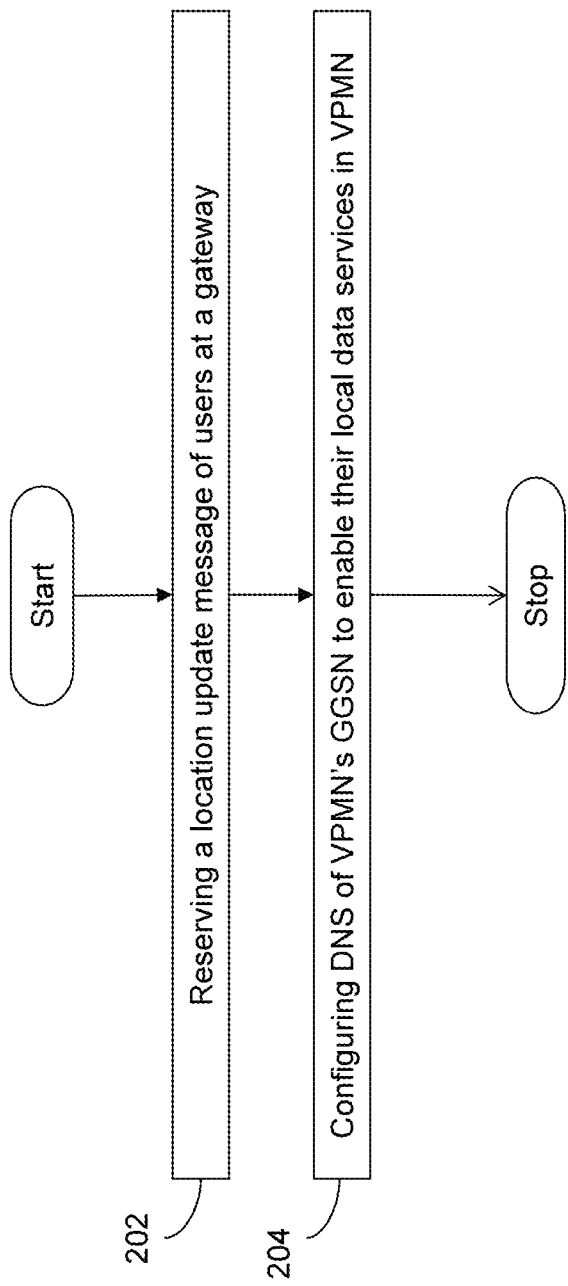
FIG. 2 represents a flowchart for implementing trading exchange for local data service, in accordance with an embodiment of the present invention.

FIG. 2 represents a flowchart for implementing the trading exchange for local data service, in accordance with an embodiment of the present invention. At step 202, gateway 110 receives a location update message of user 102. Thereafter, at step 204, the gateway 110 configures DNS of VPMN 106's GGSN 120, to resolve all roamers, like user 102's, home destined APNs to be pointed to GGSN/PGW of gateway 110.

Figure 3:
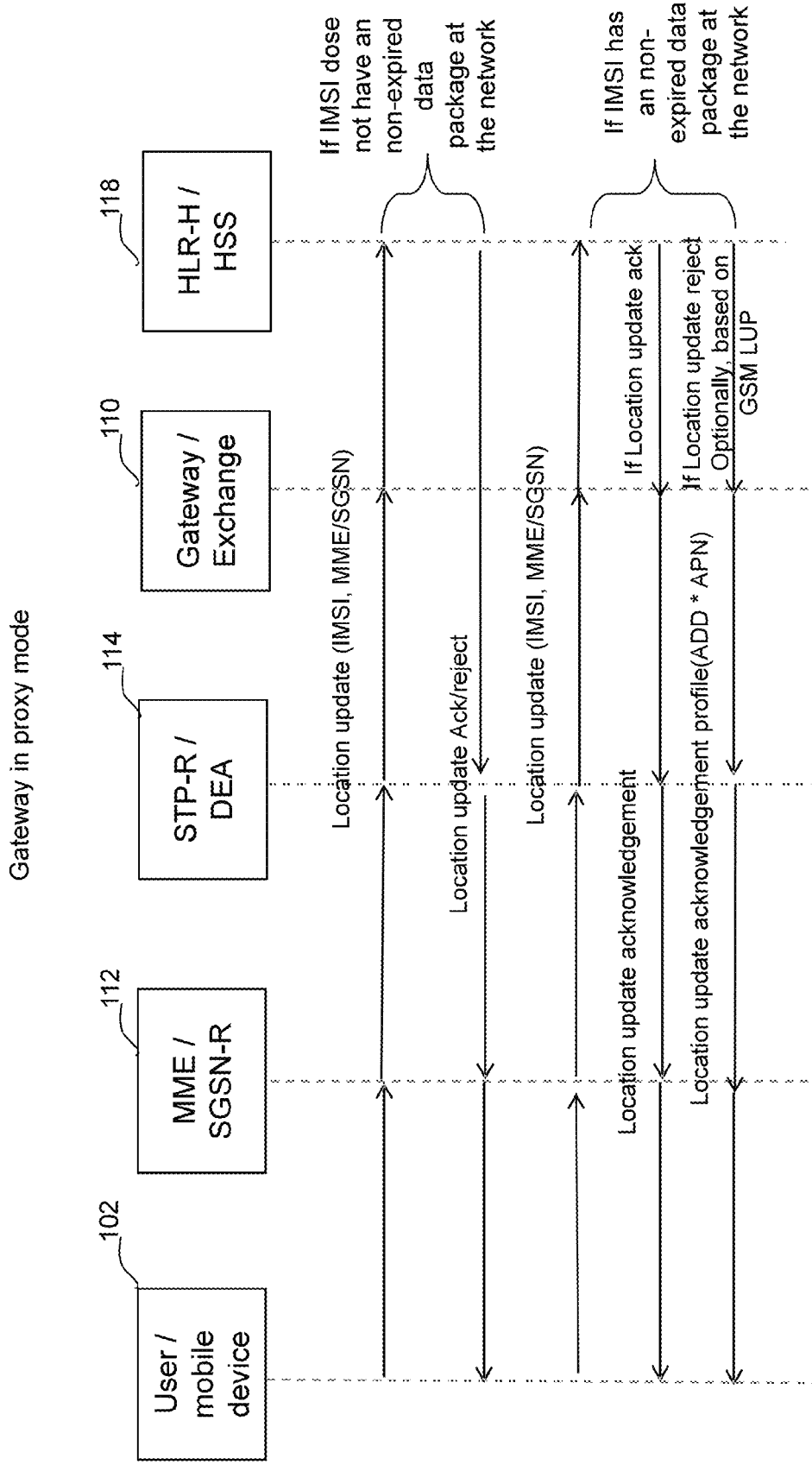
FIG. 3 represents a flow diagram for implementing the trading exchange in proxy mode, in accordance with an embodiment of the present invention.

FIG. 3 represents a flow diagram for implementing gateway 110 in proxy mode, in accordance with an embodiment of the present invention. As shown in the call flow, since gateway 110 is made as a proxy to SS7/Diameter messages location update messages, in which case still not all SS7/Diameter messages need to be proxied through gateway 110. In this case, it is possible to handle situations where the roaming user 102 might not have a data roaming service enabled (but only voice service is enabled) by HPMN 104. In this case, when the location update message is proxied thru gateway 110, if the IMSI does not have an unexpired data package at the network, then the signaling is simply bypassed by gateway 110 and subsequent return or exchange messages will not involve gateway 110. Otherwise, the return message from HPMN 104 will go via gateway 110. If there is a profile returned, gateway 110 will return unchanged. If the return message is rejecting the registration, gateway 110 will ignore the message and instead return a profiled message that includes a wildcard APN (shown by * in the figure). This embodiment is also applicable in case HPMN 104 is doing steering on the data registration. Once the data registration is granted success, it also renders the GSM/voice steering useless.

In accordance with various embodiments of the present invention, if gateway 110 allows such local data registration being successful when data roaming is not granted at HPMN 104 on condition that voice roaming is allowed, then the data registration can still be granted success and then gateway 110 waits if voice registration is successful over a period (e.g. 20 secs) and if not, then gateway 110 disables the data registration by issuing Cancel Location at the MME/SGSN-R 112, thus not allowing subsequent local data registration. Alternatively, the data registration will not be granted success but just simple reject to SGSN-R/MME 112 (up to 5 times) to wait if the voice registration is successful or not. If voice registration is successful, then the data registration is granted success. Otherwise, the local data registration is not successful.

Figure 4:
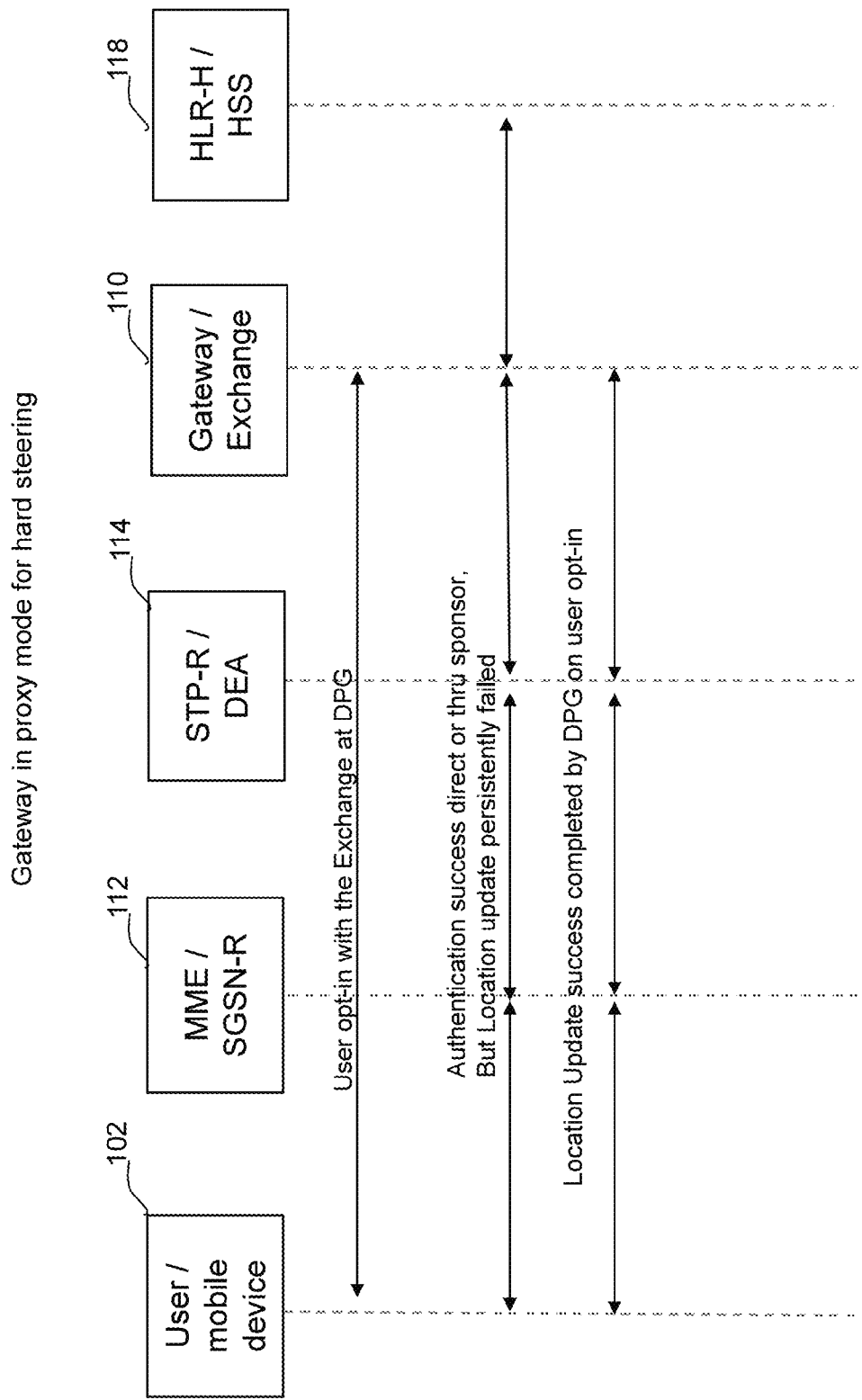
FIG. 4 represents a flow diagram for implementing the trading exchange in proxy mode for hard steering, in accordance with an embodiment of the present invention.

FIG. 4 represents a flow diagram for implementing the trading exchange 110 in proxy mode for hard steering, in accordance with an embodiment of the present invention. In order to allow an HPMN operator for doing hard steering with VPMN 106 against GSMA guidelines, user 102 must be informed the whole consequence, including but not limited to:

The home services including voice, messaging and data would not be possible

There would not be VPMN voice and messaging either except data services

Figure 5A:
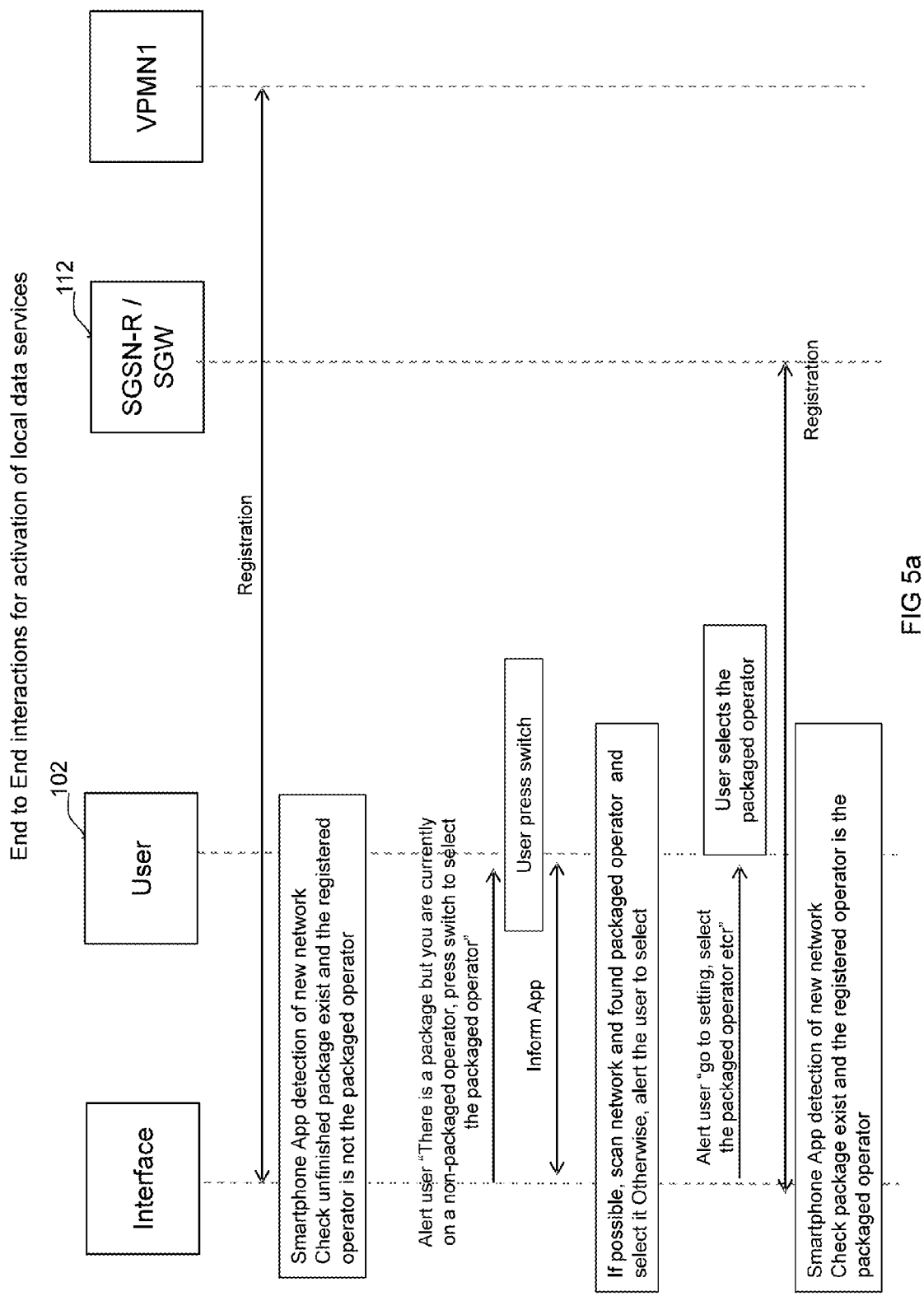
FIGS. 5a and 5b represents a flow diagram for implementing end to end interactions for activation of local data services, in accordance with an embodiment of the present invention.
Figure 5B:
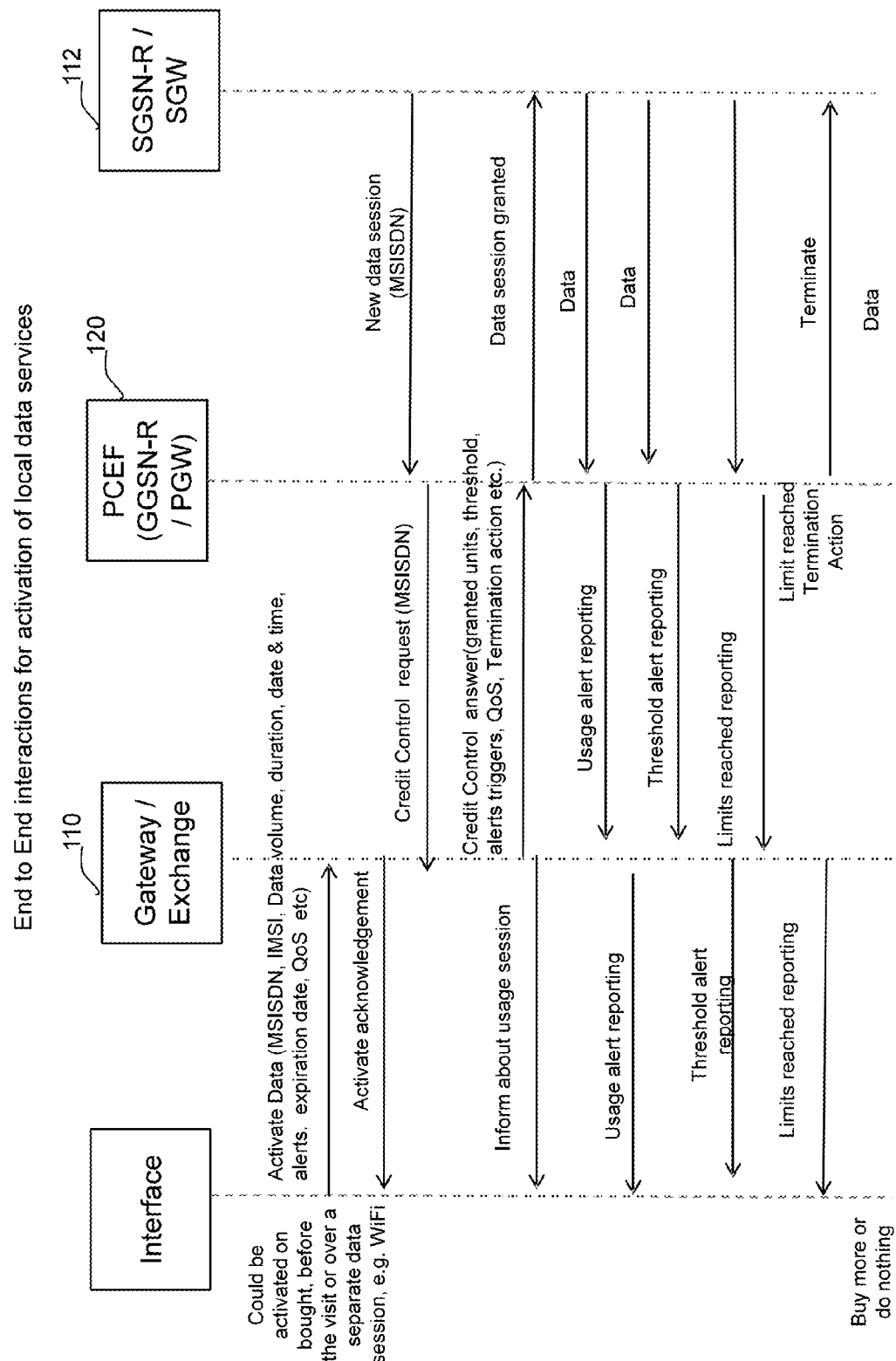

As shown in the call flow in FIG. 5, user 102 would opt in for such a situation via the trading exchange 100. The trading exchange 100 would inform the gateway 110 for the opt-in, where gateway 110 would be on the signaling path of SS7 and Diameter as a proxy. If gateway 110 observes hard steering from HPMN 104 after authentication are noted to be successful, it would complete the GPRS/Data registration gateway 110 with Local Break Out (LBO) as the only APN, and for GSM registration if CSFB/combined location update is observed. However, the user 102's profile would be restricted for any calls and message services at either VLR/VMSC-R or MME/SGSN-R 112.

In accordance with another embodiment of the present invention, in case HPMN 104 doesn't have a roaming agreement with VPMN 106, user 102 must also be informed the whole consequence, including but not limited to The home services including voice, messaging and data would not be possible There would not be VPMN voice and messaging either except data services However, in this embodiment, unlike Hard-steering where there is still authentication success, to avoid fraud, there is a need for a sponsor authentication service where the Send Authentication (SAI) is sent on a sponsor network gateway. Once this is achieved, the solution can be applied same as the hard steering embodiment explained above.

FIG. 5 represents a flow diagram for implementing end to end interactions for activation of local data services, in accordance with an embodiment of the present invention. As explained in above embodiments, the interface is software installed on user 102's mobile device via an application store. The smartphone application can also operate on a USSD and SMS channel. The functions of this interface vary according to the role of user 102. An operator administrator requires more information as negotiated with the operator. User 102 (e.g. employee) or device (e.g. M2M) under the control of an enterprise administrator can incorporate a policy control element that can be controlled by the administrator. The control element might also be operable for the individual device user with a front end interface based on the policy.

In accordance with various embodiments of the present invention, user 102 has multiple mobile accounts and trade (buys or sells) data packages on the currently activated account (or default account). For each account, user 102 can also configure threshold alert, remaining balance alert, top up alert etc. However, each mobile account must be verified at the time of registration via the corresponding SIM as HPMN 104 of user 102 needs to have a roaming relationship with VPMN 106. If this is not verified, and HPMN 104 is based on user 102's entry at the registration which is wrongly input, then if the data package of VPMN 106 bought at trading service 100 cannot be used due to no-roaming agreement, the liability would be on user 102 although user 102 could still sell the data package.

In accordance with another embodiment of the present invention, user 102 may also buy or sell data packages for its own use and might require administrator approval, depending on the enterprise policy. For example, an enterprise might have a group plan for US AT&T, but an individual employee might need to go to South Africa and buys a local data package there but need to be approved by the company.

As show in the call flow in FIGS. 6a and 6b, user 102 may receive notifications for data usage alerts, sale expired alerts, top up or switch back home data routing alerts etc. via email, web notification box, or smartphone app/interface. User 102 may also set up at trading exchange 110 to enforce home routing at a VPMN even though there is a package available at VPMN 106. The interface can also store and update usage of each purchase plan locally. Whenever there is a country change or network change, the interface can verify if there is a local package or still unused for the country. If there is, but the registered operator is not the local operator of the package or the LBO data session has not been set up properly for the local operator of the package, then the interface can alert user 102 to do a manual switch to package VPMN 104.

At the time of the switch, the interface will be used to manually select the right network (i.e., VPMN 106) to register. The interface may also be able to automatically (e.g. in case of application based on Andriod or iOS) detect the visiting country and package balance available to select the corresponding local network and data session.

It will be apparent to person skilled in the art that when the interface is manually switching to the operator network with a bought local rate data package, HPMN 103's steering system will be overwritten. Based on the GSMA guidelines BA 30 and IR 73, user 102's manual selection must be honored and overwrite steering preferences. As mentioned in earlier embodiments, if VPMN 106 is forbidden or no roaming relationship, it would not be presented to user 102 in the market place for trading of data packages.

Figure 6:
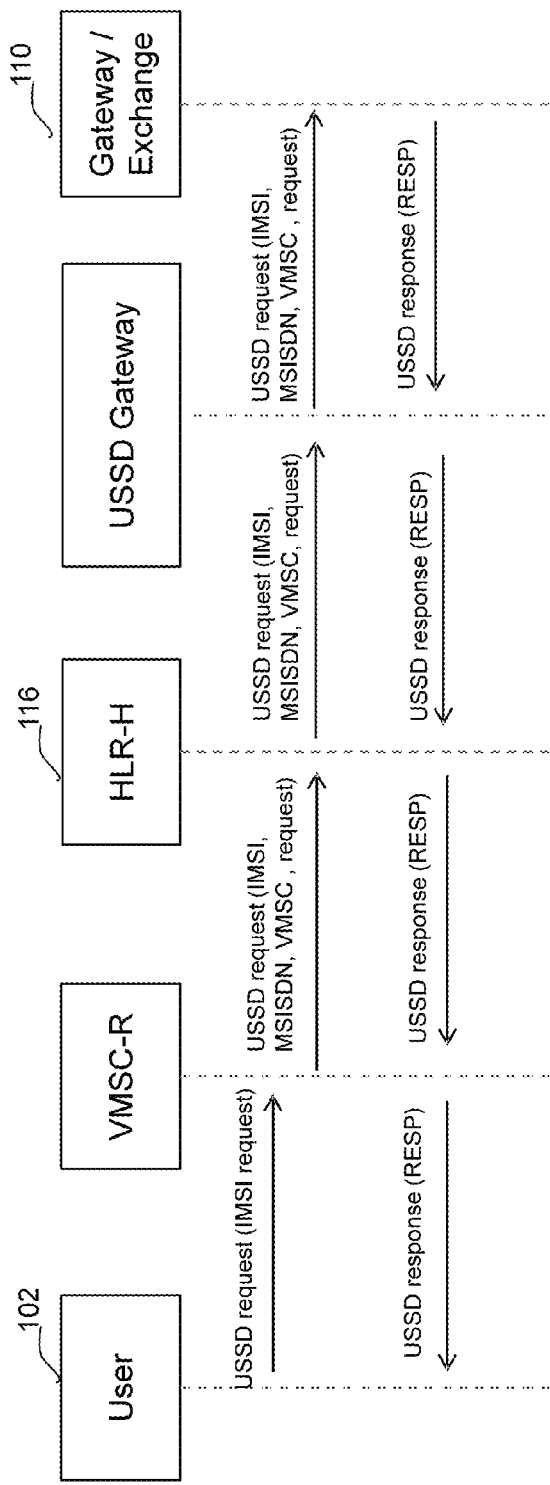
FIG. 6 represents a flow diagram for implementing activation of local data services via USSD channel, in accordance with an embodiment of the present invention.

In accordance with an embodiment of the present invention, in order to implement this trading exchange, HPMN operators are also part of the operators' ecosystem. There are several ways in HPMN operator can support this trading exchange. In one such embodiment, FIG. 6 represents a flow diagram for implementing activation of local data services via USSD channel. HPMN 104 provides a USSD interface for menu selection for its subscribers (i.e. user 102) already outside the country or simply just for own subscribers making a purchase of data packages without incurring data (or data roaming) charges. HPMN 104 defines HPMN USSD service code at HLR-H 116 and a USSD gateway. There is an IP interface between USSD Gateway and Exchange Service/Gateway 110. HPMN 104 provides to the interface with subscriber HPMN network, MSISDN, visiting network etc. and gateway 110 presents a corresponding menu dynamically based on the user 102's HPMN network and the visiting country (based on VPMN 106). Similar concept to USSD, SMS channel can also be used. However, due to speed impediment in using SMS and still incurring roaming cost, the embodiments of the present invention may be implemented using SMS, in some situations.

Figure 7:
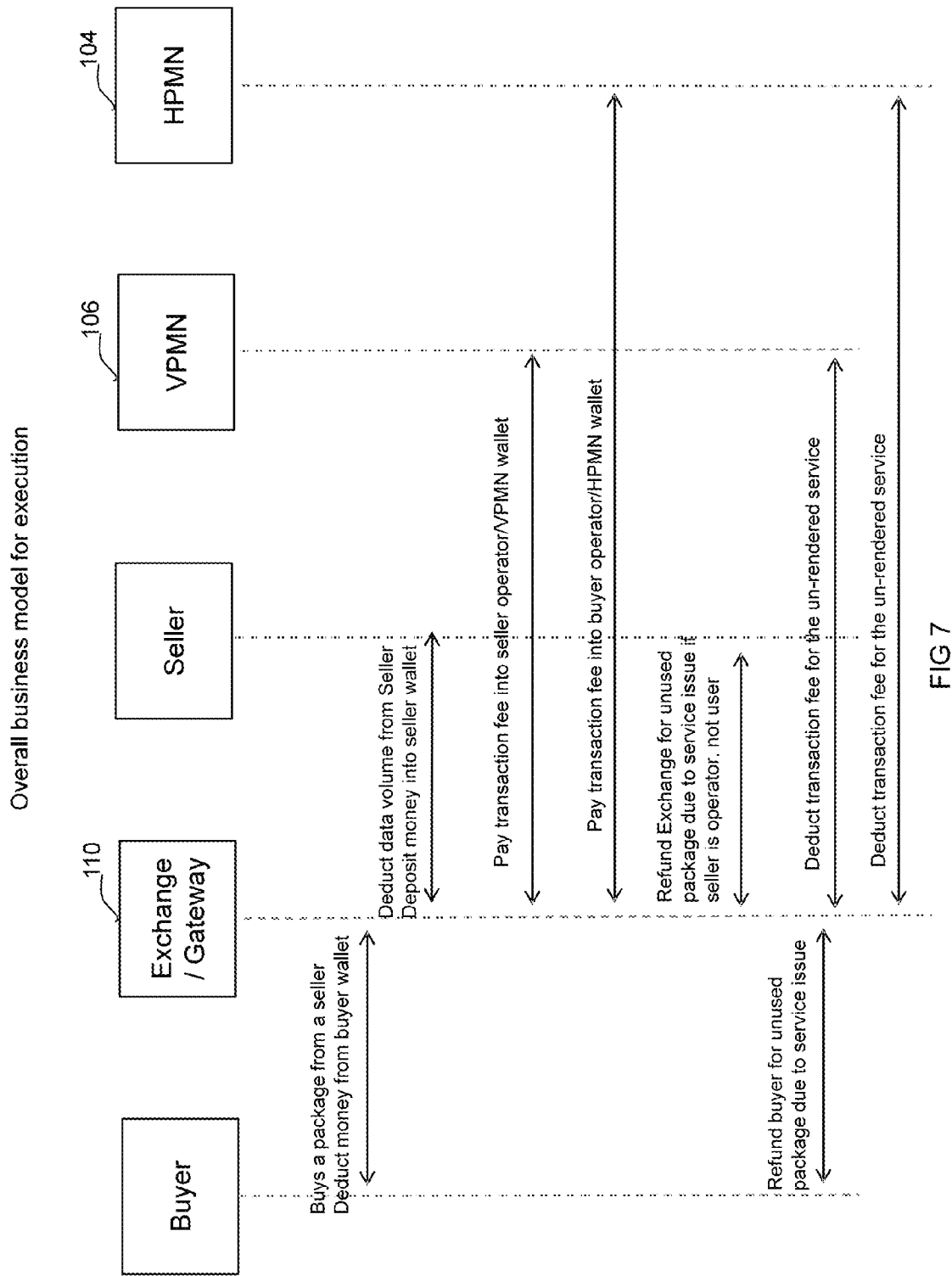
FIG. 7 represents a flow diagram for overall business model and its key transactions, in accordance with an embodiment of the present invention.

As explained in various above embodiments of the present invention, there is a business case for operators of the ecosystem to benefit from this trading exchange. FIG. 7 represents a flow diagram for overall business model and its key transactions, in accordance with an embodiment of the present invention. The basic business model of the service is that the exchange 110 takes a transaction fee of a transaction. Exchange 110 acts as a broker or middle man that handles all the transactions and payments. All monetary exchange would be prepaid and based on a cascading model. The seller decides the price of data package. The buyer of a transaction by a seller pays exchange 110 as a broker. Exchange 110 pays the seller minus the transaction fee. Exchange 110 shares the fee with the seller's mobile operator and the mobile operator of the buyer if the buyer's mobile operator is a HPMN operator (like HPMN 104) of the ecosystem of the trading communication exchange. Exchange 110 is liable for the seller and the buyer is liable for exchange 110. Because all transactions are prepaid, the risk for exchange 110 is the least. Although there is no financial clearing per se, the seller's operator can do data clearing with the exchange for reconciliation, whose success can be based on an agreed margin of error (e.g. 1%-3%) and a settlement procedure on any failed reconciliation.

It will be apparent to a person skilled in the art that the trading exchange is not operating as a MVNO model but as simply an electronic retail distribution model for operators tailored for locals, travelers and enterprises without a new SIM for user 102. Although, it is trading local rate data service, it does not offer customer care to end user communication service. This is very similar to other trading exchanges like eBay, Priceline, selling car rentals/hotels where these trading services do not provide customer care for the hotel or car service. As a result, the customer care for end user communication service is still with the serving or home mobile operator. This is similar to car rental bought through Priceline where car service is still a responsibility of the car rental company.

Notwithstanding, trading exchange 110 has its own customer care for handling complaints about the trading service rendered by mobile operator at exchange 110, similar to customer care in Priceline or Hotel.com. As the users and merchants' financial transactions are going through the exchange 110 as a broker, similar to issuing/acquiring banks of credit cards for charge backs, the trading service would also handle refunds in case the user service is not rendered for the paid packages. In the case, the refund is cascaded as well. The trading service would refund the users and the operators/merchants would need to refund the trading service including all transaction fees.

Figure 8:
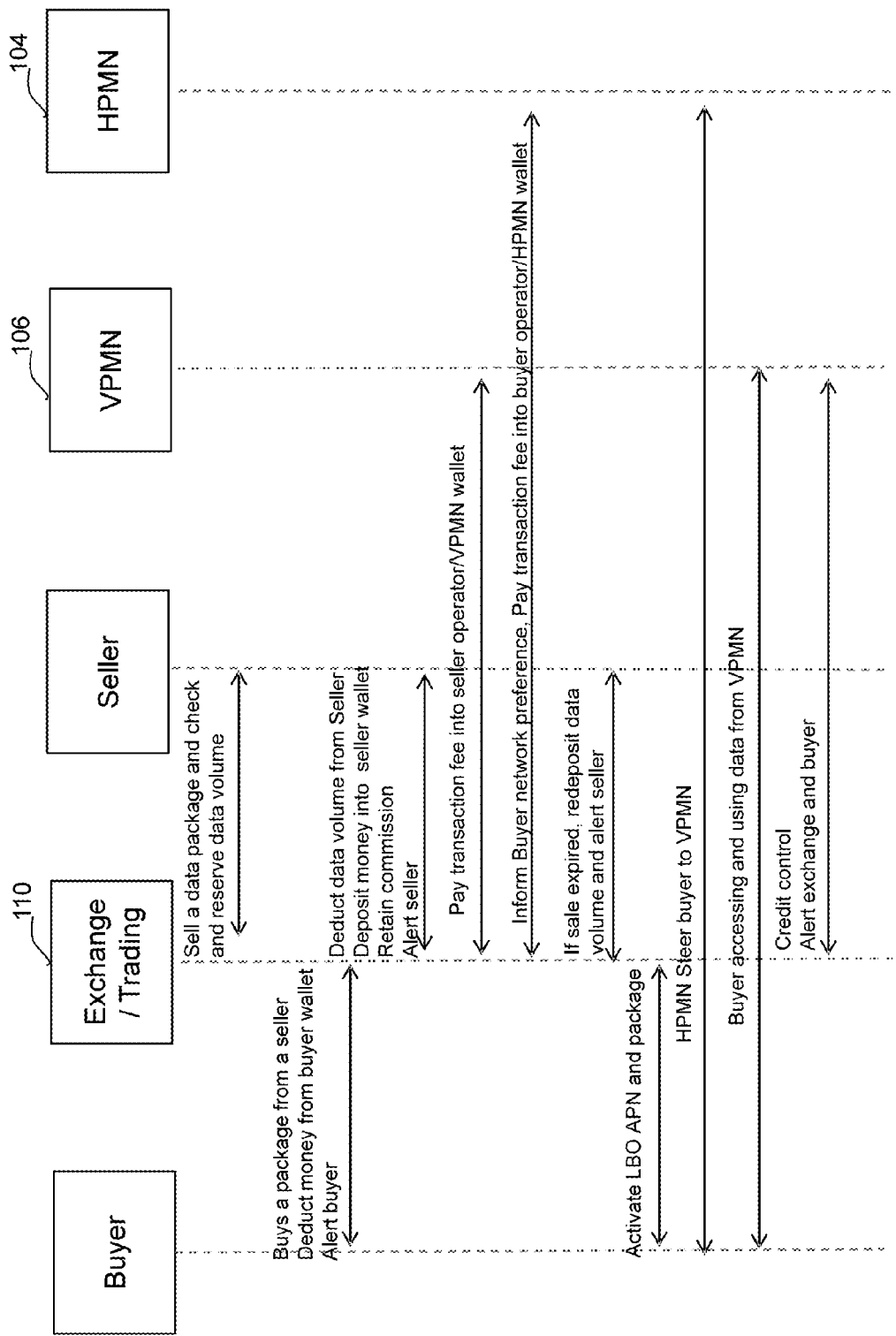
FIG. 8 represents a flow diagram for sample transaction process in activation of local data services, in accordance with an embodiment of the present invention.

In accordance with one embodiment of the present invention, if the seller is a user in addition to an operator, then the refund process would only be done by exchange 110 as the user might lose opportunity to sell to another buyer and the user is not at fault for any service issue. FIG. 8 represents a flow diagram for sample transaction process in activation of local data services, in accordance with an embodiment of the present invention. A seller puts a data package on sale to exchange 110. Thereafter, exchange 110 validates the data package and reserves it if the seller is an operator. If the sale is expired, exchange 110 re-deposits the data package pack if the seller is not an operator and alerts the seller. If there is a buyer, the buyer money would be deducted from its account and alerted for the transaction; and the seller account would be credited including commission for the trading exchange, and VPMN and HPMN for the transaction fees etc.

Figure 9:
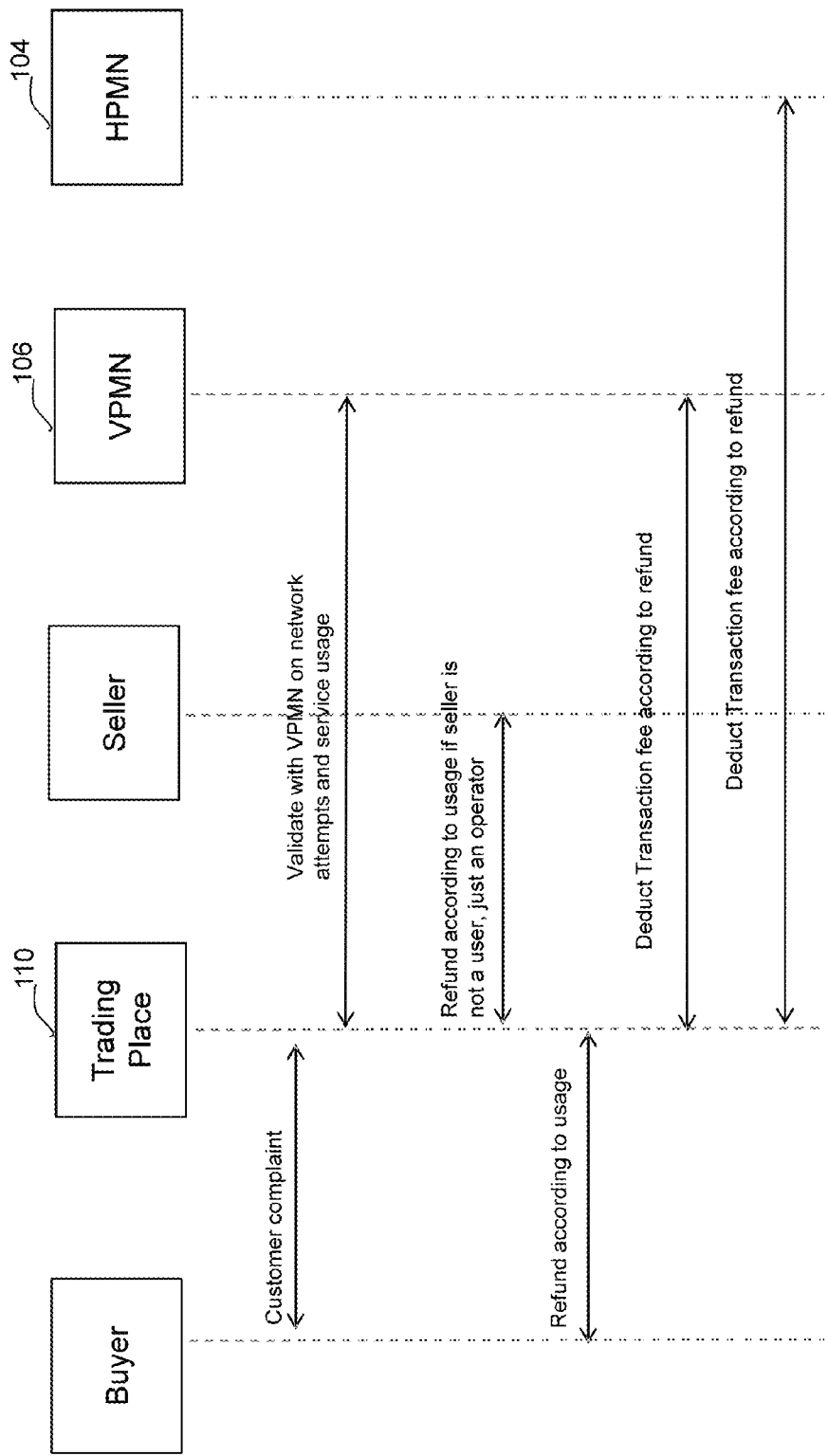
FIG. 9 represents a flow diagram for sample refund process in activation of local data services, in accordance with an embodiment of the present invention.

After the buyer activates the local package and visits the country, HPMN 104 helps to steer the roaming user 102 to the operator of the data package. The buyer accesses VPMN 106 where credit control is made with exchange 110 and alerts are communicated with exchange 110 and the buyer. FIG. 9 represents a flow diagram for sample refund process in activation of local data services, in accordance with an embodiment of the present invention. The buyer complains about unable to render the service on the data package bought at VPMN 106. Thereafter, exchange 110 validates the complaint with VPMN 106 to see if there are any network attempts and failure to establish a data session. Of course if the buyer is found not to have made such a trace, refund would not be granted. Subsequently, exchange 110 asks VPMN 106 for a refund if the VPMN is the seller including transaction fees from HPMN 104 and VPMN 106. Finally, exchange 110 refunds the buyer.

The various embodiments of the present invention are based on a basic architecture involving three key components, trading exchange, software interface on user's mobile device, and finally the participating operators. The exchange 100 consists of the Trading exchange 110, OCS, GGSN/PGW and PCRF functions. The trading exchange 110 is the store front for the buyer and seller to trade data package plans. The GGSN/PGW processes the data packages of VPMN. The OCS controls the prepaid usage and quality service, and the PCRF controls the policy on the charging and QoS control of the GGSN/PWG.

Figure 10:
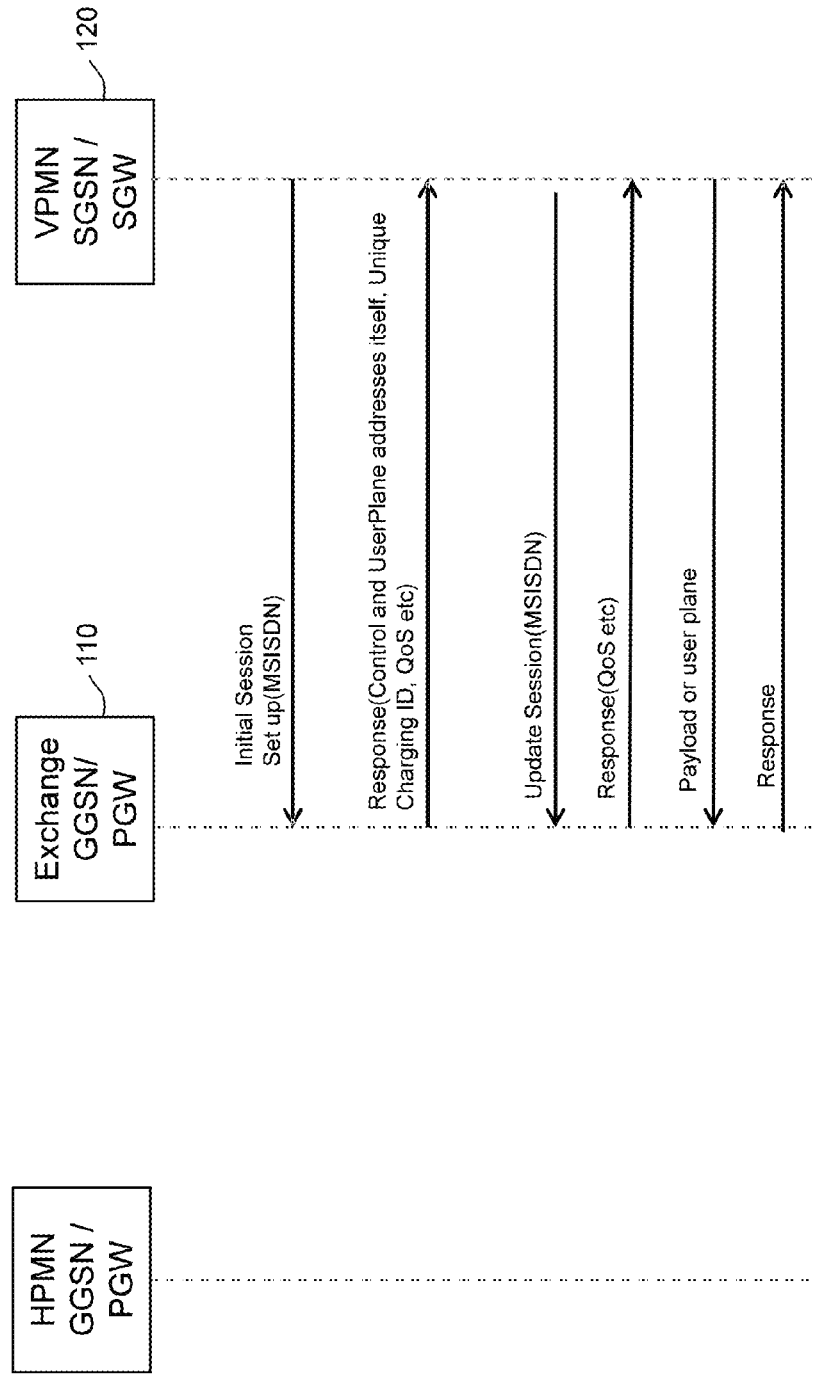
FIG. 10 represents a call flow diagram when there is an un-expired data package and no home routing, in accordance with an embodiment of the present invention.

In accordance with various embodiments of the present invention, VPMN 106 SGSN/SGW 120 proxies via GRX/IPX/IP-VPN (MPLS or carrier Ethernet) all international roamers initial data control session through exchange 110's GGSN/PGW by an updated DNS process on all international roamers home destined APNs. The exchange 110's GGSN/PGW checks if the roamer has an unexpired data package at the VPMN and the roamer has not configured to go home routing only. FIG. 10 represents a call flow diagram showing when user has un-expired data package and no home routing configured, in accordance with an embodiment of the present invention. The Exchange 110's GGSN/PGW will return itself as both, the control address and the user plane session address as well as its Charging ID to the VPMN SGSN/SGW 120. Subsequent control and data payload (user plane) exchange then happens between VPMN SGSN/SGW 120 and the exchange 110's GGSN/PGW. The OCS and PCRF will control its QoS, usage and all the alerts processes including end users.

Figure 11:
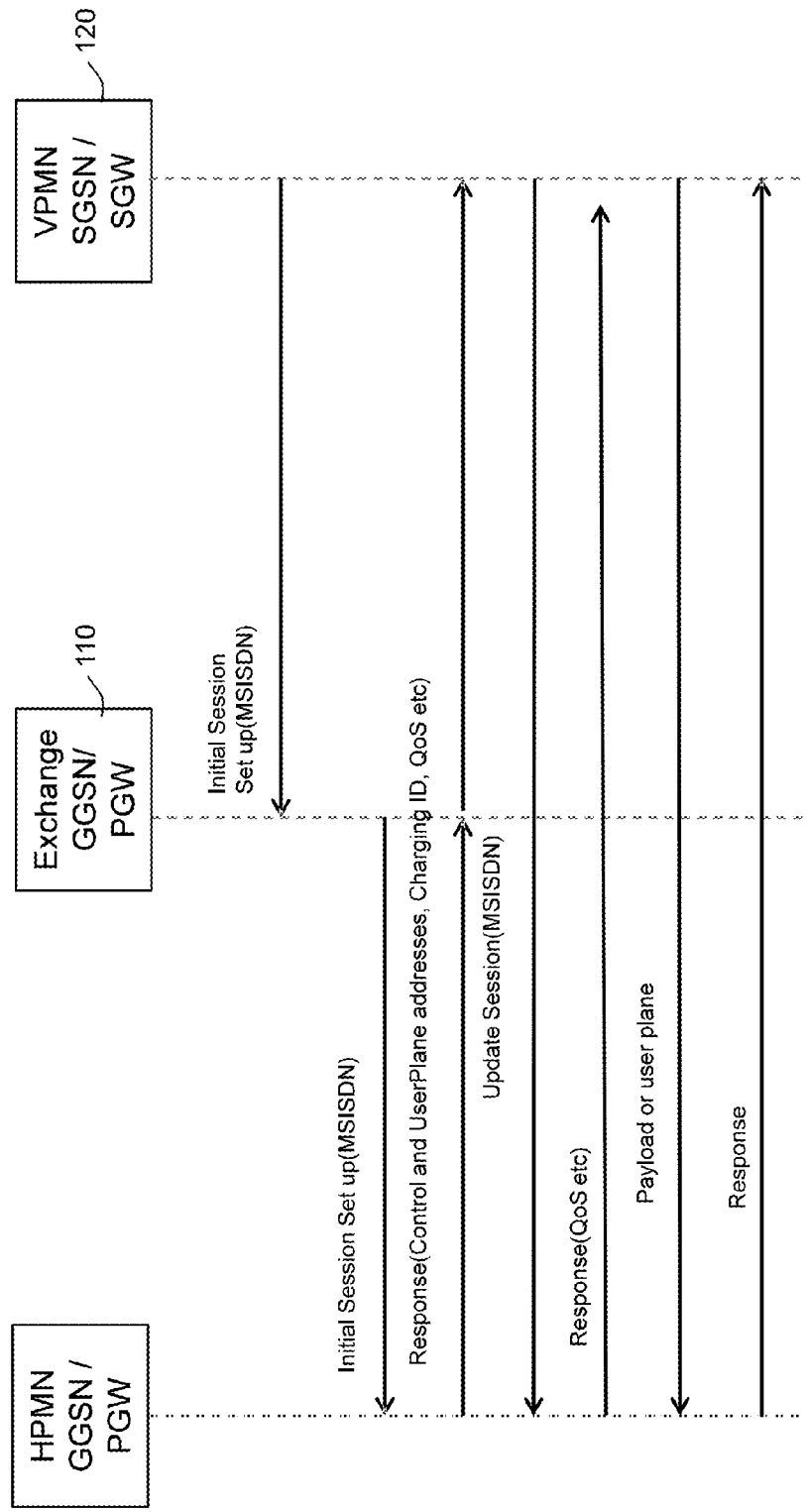
FIG. 11 represents a call flow diagram when there is no un-expired data package and home routing enabled, in accordance with an embodiment of the present invention.

Alternatively, in accordance with another embodiment of the present invention, FIG. 11 represents a call flow diagram when there is no un-expired data package and home routing enabled for a roamer. If roamer, i.e., user 102 does not have an unexpired data package at VPMN 106 or user 102 has set home routing at trading exchange 110 via the interface, then exchange 110's GGSN/PGW will proxy the initial control session via GRX/IPX towards HPMN GGSN/PGW via the GRX/IPX DNS service. The response will also return through the exchange 110's GGSN/PGW, which would pass all control and data user plane addresses as well as charging ID etc. unchanged to VPMN SGSN/SGW 120. All subsequent control and data payload (user plane) exchange will be directly between VPMN SGSN/SGW 120 and the HPMN GGSN/PGW.

It will be apparent to a person skilled in the art, that the charging ID and the GGSN/PGW control/user plane address is used to distinguish between normal data roaming CDRs and exchange 110 based data roaming CDR. Since the local rate data session goes via the exchange 110's GGSN/PGW, it could also add DPI control, to allow exchange 110 to produce Big Data insight on users for traveling business (such as but not limited to hotel, airlines etc.).

The software interface interacts with the Exchange Service over a bidirectional or peering IP interface, which means either party can initiate request/push. The software application can obtain a store market place from the exchange 110. It can notify exchange 110 on any activation by user 102. Thereafter, exchange 110 can also push notifications (e.g., data usage alerts, threshold alerts) to the software interface. Exchange 110 interacts with operator backend over also a bi-directional or peering IP interface which means either party can initiate request/push. Subsequently, exchange 110 can send the operator info on a user bought or sold data package to enforce/update a credit control on user 102. The operator can check usage authorization, push notification (e.g. data usage alerts, threshold alerts) to exchange 110.

Figure 12:
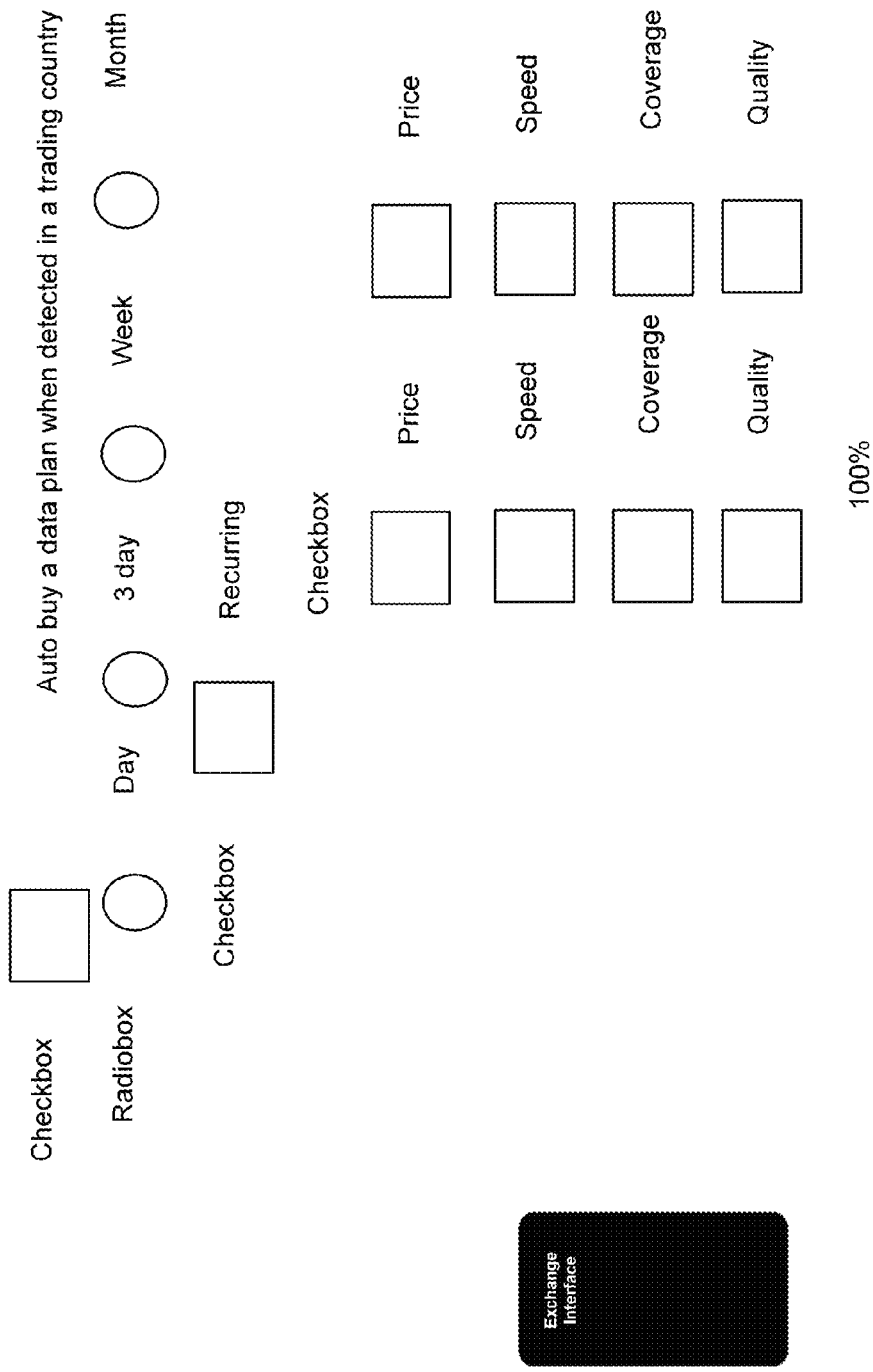
FIG. 12 represents an indicative user interface to configuring local data services on users' device, in accordance with a first embodiment of the present invention.

In accordance with various embodiments of the present invention, the trading exchange can also be extended to automatically select a data plan and sells an unused plan for a subscriber should he opt-in so based on the criteria he sets. In accordance with one such embodiment of the present invention, FIG. 12 represents an indicative user interface to configuring an auto-buy of local data services on users' device. To automatically buy a plan, user 102 may preset a day-plan, 3-day-plan, a week plan, or a month plan. He can also define criteria based on coverage, speed, price and quality either based on simple checkbox or based on a percentage weight in total of 100%. There is also a recurring option for user 102 to check so that if the current plan is finished and the subscriber is still in the country.

This automation is triggered by the software interface detecting user 102 is registered in a network in a country that trades data plan in the trading exchange. Then the software interface can communicate with the trading exchange via USSD or WiFi to avoid incur roaming charge. When the current plan is used up or about to be used up, the trading exchange would inform the software interface via SMS or data channel of the bought data package. If the software interface detects the user 102 is still registered in the country, and the software interface informs the trading exchange via USSD or WiFi to avoid incur roaming charge. If user 102 has opted in for the recurring option, another plan would be bought.

Figure 13:
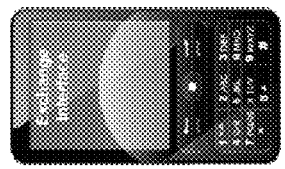
FIG. 13 represents an indicative user interface to configuring local data services on users' device, in accordance with a second embodiment of the present invention.

FIG. 13 represents an indicative user interface to configuring an auto-sell of local data services on users' device, in accordance with an embodiment of the present invention. To automatically sell an unused plan, user 102 sets the condition based on detection of him reaching home or another country or just based on his currently daily usage rate to sell unused data package. The price would be defined by the trading exchange 110 to the best of its capability. The automation is triggered by software interface detecting user 102's mobile is registered in a network in a home or another country or based on the daily usage rate at the trading place.

In accordance with various embodiments of the present invention, the exchange 110 manages a wallet account for each registered user similar to Paypal or Amazon Payment due to transactional funds similar to Ebay or Paypal. Like the Paypal the account could be backed up by credit card or bank transfer automatically when the balance is running out.

Also like the Paypal, the balance could be cashed out directly via a bank card or transfer back to a bank account.

The roamers' usage on trading place data package at an operator must be dropped from normal TAP processing by the operator to avoid double billing the roamers. These can be done via the filtering the charging ID or GGSN user plane IP address. If a SGSN/SGW data CDR consists of the charging ID or GGSN user plane IP address of our solution, then it is filtered from TAP process and routed to another process for clearing and reconciliation between the operator and the exchange.

Although all payments are prepaid, there could still be errors. There could be need for reconciliation periodically (e.g. monthly). If the difference is within a certain percentage (1-3%) as agreed, then no further action is required. Otherwise there will be a clearing and settlement effort. The period could be dynamically adjusted based on the frequency of the effort.

In accordance with various other embodiments of the present invention, in case of M2M or IoT, there wouldn't be a need for downloadable software application from application store but a client pre-installed or downloadable from the Internet (including the application store). The enterprise administrator of the M2M/IoT devices can buy data plans on various countries for the devices. These plans can be activated automatically only on delivery or on arrival. The delivery trigger would be manually done on each one (e.g. before shipping out). The arrival trigger can be automatically or manually set when the device reaches the country where the new country information is sent by the device client to the trading exchange.

Although the local rate is only applied to data services, it is recommended that these devices use VoIP applications should voice services be required, e.g. for telematics (such as BMW services use VoIP already). Some countries' regulations require data access to be restricted (e.g. certainly Internet sites are restricted or videos of sensitive sites are not sent outside the country). Currently the solution is normally to use a local IMSI. In various embodiments, local breakout is used to ensure regulation is respected. In this case, a local GGSN/PGW would be deployed in such regulated countries.

Finally, since there could be an embedded client, the client would be informed the plan of the VPMN (or VPMNs) and can select the right VPMN (such as VPMN 106) in network registration. If there is no client, then HPMN 104 must use its own steering system to direct the device to the right network. Since M2M services are often offered using the SIMs of home operator (e.g. ATT for Kindle or Verizon for m2M, Vodafone for M2M), steering of roaming support would not be a problem, In accordance with several other embodiments of the present invention, the trading exchange can also be extended to auctioning of data packages, similar to Priceline or Ebay. The present invention allows user 102 to be a seller other than an operator, the auction allows the following possibilities:
 a) The buyer can name own price
 b) The buyer can bid for a deal
 c) The seller can provide an optional minimum price and an optional definite sell price for buyers to bid (within a bid period)
 d) The seller can just present a non-negotiable pricing
 e) There can be multiple operators' offering to choose.

However, the auction extension in the non-operator merchant seller case continues to be restricted to packages bought via the trading exchange.

In accordance with an embodiment of the present invention, the data package bought could be application based charging. For example, only Facebook is free with the bought data package. Or the data package would be unlimited for the fixed price but with speed downgraded to 2 G. VPMN 106 could also allow a URL access for free for the trading exchange 110. This will be automatically updated into the software interface for accessing the store front when the user 102's device is accessing the network.

In another embodiment of the present invention, the trading exchange can be extended to support VoIP by offering multiple number VoIP service where a member mobile operator of the ecosystem can contribute a local number for roamers or non-member customers to permanently or temporarily use for making or receiving calls and SMS. Moreover, the trading exchange can bind incoming calls to a user's number of the member mobile operator over IP to reduce roaming cost.

It yet another embodiment of the present invention, a travel enterprise (e.g. airline, hotels, tourist business including shopping and restaurants etc.) software application is built on the trading exchange API so that the cost on the usage of user 102 on the software application in roaming or local environment including VoIP calls can be covered by the enterprise for the trading exchange. In this case, the enterprise does the B2C advertising and own services including free or sponsored data roaming and VoIP calls. The enterprise also does cross advertising and B2B trading among related enterprise on the exchange, for example, Chase Bank advertise on Nike App, hotels on airline apps, car rentals on hotels etc. In a continued embodiment of the present invention, OTT apps such as Skype, Facebook, WhatsApp, Google voice etc. are built on the trading exchange to leverage a sponsored data plan in return for advertising revenue. Moreover, all the buyers' traveling destinations, data usage statistics, buying expense etc., and all the sellers' unused data amount statistics and selling operators etc. provide valuable analytics for advertising, traveling enterprise apps and targeted marketing of further trades.

In other embodiment of the present invention, the trading exchange tracks and report application protocols and URLs etc. based on DPI support of VPMN 106. In particular, VPMN 106 provides foot fall data intelligence on travelers, while the trading exchange provides travelers profiles around the world. The combined profile allows traveling enterprises to form targeted advertising on different enterprise applications. If HPMN 104 also participates, more subscriber profile data (on local usage and worldwide roaming usage) is used for better targeted advertising.

However, that all privacy issues are protected in the following ways:
 1) Only generic profile data (e.g., male more than 50 years, spending 50 USD a day etc.) is collected and cannot be related to an individual user (e.g. John P. of ABC company)
 2) While the generic profile data is collected and shared across enterprise apps for targeted advertising, it is not shared for sign on to avoid correlation-ship with individuals.

The analytics services such generated are used by enterprise including M2M and IoT. In such cases, user 102's mobile's software interface is configured by enterprise admins to track and report all usage information.

It will be apparent to a person skilled in the art that when LBO is chosen, software application residing on user 102's mobile device would inform the trading exchange 110 for the local breakout device data access profile. When home routing is chosen, the device client would inform the trading place 110 for the home device data access profile. In general, The VPMN routing via the exchange service 100 does not interfere with other services such as CSFB and VOLTE. For CSFB, it does not concern with local breakout or home routing, just combined location updates, which is still the case as before even though a data session might be conducted via local network elements. For VOLTE, there will be another APN-IMS used for local breakout. The VPMN DNS on IMS APN should still point to the VPMN GGSN/PGW rather than the exchange 110's GGSN/PGW. As devices allow multiple APNs and local breakout sessions, there should not be any interference. As VOLTE is still considered as voice roaming even though it is a data service, it would not incur local data package consumption and also not cause confusion to the user 102.

In yet another embodiment of the present invention, since the trading exchange operates based on MSISDN, number portability works when changing operators except when the new operator has no roaming relationships with the visiting operator of the bought package. User 102 still will be liable for payment in this exceptional case, similar to no-show cancellation on non-refund, e.g. trip cancelled. However, unlike no-show cancellation policy, user 102 can sell the unused package to other users through the trading exchange. If user 102 changes numbers either on existing or new operators or the user 102 intends to use another SIM, user 102 will still be liable for the payment. However, user 102 can transfer the data package on its new number without incurring any charges. User 102 can also sell it but that would incur additional charges.

In accordance to another embodiment, the number portability feature is used to implement gifting. Unlike number change, the gifting might not verify the gifted party's number although to avoid mistakes, it is recommended to verify it. The software interface manages multiple SIMs accounts to allow user 102 to swap SIMs, as the software interface can switch accounts as buyers and sellers for the correspond SIMs. However, each SIM can only have one account, verified at the time of registration. Once registered, user 102 is free to use the trading service using any SIMs as it can switch accounts on line for trading data packages on the selected account.

In accordance with yet another embodiment of the present invention, the gateway 110 facilitates local data roaming for users using multi-IMSI SIM. The new multi-IMSI SIM has several static IMSIs based on partnership between operators.

In accordance with another embodiment of the present invention, a seller can only be a VPMN role operator or a buyer of a VPMN data package bought earlier on the trading platform. However it does not matter what type of user the subscriber is (prepaid/postpaid) as far as the VPMN or the HPMN is concerned as the seller or buyer would be registered prepaid account holder on the trading place which is also an OCS itself for the LBO related data services, rather than an account in operator backend (BSS/OSS) even though the seller is an operator.

The buyer can be from any operator that has roaming relationship with the operator of a seller. It can be a subscriber belonging to the same operator or a different operator (nationally or internationally). It does not matter what kind of user (prepaid or postpaid) the buyer is as far as the home operator of the buyer is concerned. When a bought prepaid package is using up, the buyer would be alerted before use up or after use up for further trades. However this could cause data session disruption.

Sometimes a buyer prefers a pay as you go package (e.g. 2 USD/1 GB) without worrying about top up or session disruption. For such an offering, due to 4 G speed, it is important to have enough time to top up by the trading service as the whole transaction need be prepaid as far as VPMN is concerned, to avoid revenue leakage.

To achieve this, the trading minimum quota for pay as you go package would be proportional to the speed of the access technology. For example, for 4 G, it has to be 1 GB minimum; for 3 G, it has to be 500 MB and for 2 G it has to be 100M. The Trading Service OCS would request the VPMN or serving operator Exchange PCEF via the Gy interface to send usage alert when the data package of such a pay as you buyer is running low to the 10% of the minimum package, e.g. 4 G 100 MN, 3 G 50 MB, 2 G 10M. When such an alert is triggered by the operator PCEF over Gy interface to the trading service OCS later on, the trading service would have enough time to deduct money from the buyer and deposit money into the operator minus transaction fees (to the operator and possibly the home operator of the buyer) and grant the PCEF additional quotas.

It also allows buyers of VPMN data package to sell unused data packages even though the buyers are not subscribers of the VPMN. The VPMN original sale transaction would not be affected and all payment made before such as commission all would stand. When such a user puts up a sale, the trading place would simply check with its own OCS for the remaining balance to be enough for a sale and reserve it. If the sale went through, the data volume would be deducted and added to the buyer at the OCS, with money transferred from the buyer wallet to the seller wallet minus the commission. In this case, the commission would be shared with the VPMN and the new buyer's HPMN if the HPMN is a HPMN role operator of the ecosystem of the trading place.

In accordance with various other embodiments of the present invention, to facilitate an operator joining the ecosystem, the exchange service 100 also offers the cloud based supplementary services:

1) SoR with SIGTRAN and Diameter IP interfaces to the VPMN STP and DEA (Diameter Edge Agent) respectively.

2) HPMN USSD gateway with SIGTRAN interface to the HPMN HLR

3) VPMN USSD gateway with SIGTRAN interface to the VPMN MSC

4) Dynamic Profile Gateway with SIGTRAN interface and Diameter interface to the STP and DEA respectively.

5) The data registration probe on SS7 and Diameter might also be required if the STP and DEA are not able to notify the Dynamic Profile gateway.

In various embodiments of the present invention, multiple POPS with multiple VPN or IPVPN/MPLS connection to Operator's backend. Perhaps a redundant IPX connection would be an even better secure, QoS assured and redundant solution to connect to an operator's internal systems. Since IPX is in the cloud and there are already many POPs around the world, each VPMN member can connect via an IPX operator or leased or IPVPN/MPLS connection to the Exchange.

In accordance with embodiments of the invention, the interface in exchange service 100 involves no hardware delivery (and its associated logistics and costs) to the user, just a simple client download from the application store. There is no need to worry about phone being locked. There is no APN change is required, as all home destined APNs are proxied thru our Exchange GGSN/PGW on initial data session control messages. If the session is deemed truly going home, subsequent control messages and payload or user plane packets are going directly with the home GGSN/PGW. The multi-IMSI session could also do the similar trick but the risk would be far greater because it is using a local IMSI and hence all local control messages would also be going through the proxy gateway.

It will be apparent to a person skilled in the art, that the present invention can also be applied to Code Division Multiple Access (CDMA)/American National Standards Institute #41D (ANSI-41D), and various other technologies such as, but not limited to, VoIP, WiFi, 3GSM and inter-standard roaming. In one exemplary case, a CDMA outbound roamer travels with an HPMN CDMA handset. In another exemplary case, the CDMA outbound roamer travels with an HPMN GSM SIM and a GSM handset. In yet another exemplary case, GSM outbound roamer travels with an HPMN CDMA RUIM and a CDMA handset. To support these variations, system 100 will have a separate SS7 and network interfaces, corresponding to both the HPMN and VPMN networks. It will also be apparent to a person skilled in the art that these two interfaces in different directions may not have to be the same technologies. Moreover, there could be multiple types of interface in both directions.

An exemplary list of the mapping between GSM MAP and ANSI-41D is described in the table below as a reference.

| GSM MAP | ANSI-41D |
| --- | --- |
| Location Update/ISD | REGNOT |
| Cancel Location | REGCAN |
| RegisterSS | FEATUREREQUEST |
| InterrogateSS | FEATUREREQUEST |
| SRI-SM | SMSREQ |
| SRI | LOCATION REQUEST |
| ForwardSMS | SMSDPP |
| ReadyForSMS | SMSNOTIFICATION |
| AlertServiceCenter | SMSNOTIFICATION |
| ReportSMSDelivery | SMDPP |
| ProvideRoamingNumber | ROUTING REQUEST |

The present invention can take the form of an entirely hardware embodiment, an entirely software embodiment, or an embodiment containing both hardware and software elements. In accordance with an embodiment of the present invention, software, including but not limited to, firmware, resident software, and microcode, implements the invention.

Furthermore, the invention can take the form of a computer program product, accessible from a computer-usable or computer-readable medium providing program code for use by, or in connection with, a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CDROM), compact disk-read/write (CD-R/W) and Digital Versatile Disk (DVD).

The components of present system described above include any combination of computing components and devices operating together. The components of the present system can also be components or subsystems within a larger computer system or network. The present system components can also be coupled with any number of other components (not shown), such as other buses, controllers, memory devices, and data input/output devices, in any number of combinations. In addition, any number or combination of other processor-based components may be carrying out the functions of the present system.

It should be noted that the various components disclosed herein may be described using computer aided design tools and/or expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof.

Unless the context clearly requires otherwise, throughout the description and the claims, the words "comprise," "comprising," and the like are to be construed in an inclusive sense as opposed to an exclusive or exhaustive sense; that is to say, in a sense of "including, but may not be limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, it covers all of the following interpretations: any of the items in the list, all of the items in the list and any combination of the items in the list.

The above description of illustrated embodiments of the present system is not intended to be exhaustive or to limit the present system to the precise form disclosed. While specific embodiments of, and examples for, the present system are described herein for illustrative purposes, various equivalent modifications are possible within the scope of the present system, as those skilled in the art will recognize. The teachings of the present system provided herein can be applied to other processing systems and methods. They may not be limited to the systems and methods described above.

The elements and acts of the various embodiments described above can be combined to provide further embodiments. These and other changes can be made in light of the above detailed description.

Other Variations

Provided above for the edification of those of ordinary skill in the art, and not as a limitation on the scope of the invention, are detailed illustrations of a scheme for proactive roaming tests, discoveries of roaming partner services and discoveries of frauds in roaming using simulated roaming traffic. Numerous variations and modifications within the spirit of the present invention will of course occur to those of ordinary skill in the art in view of the embodiments that have been disclosed. For example, the present invention is implemented primarily from the point of view of GSM mobile networks as described in the embodiments. However, the present invention may also be effectively implemented on GPRS, 3 G, CDMA, WCDMA, WiMax etc., or any other network of common carrier telecommunications in which end users are normally configured to operate within a "home" network to which they normally subscribe, but have the capability of also operating on other neighboring networks, which may even be across international borders.

The examples under the system of present invention detailed in the illustrative examples contained herein are described using terms and constructs drawn largely from GSM mobile telephony infrastructure. However, use of these examples should not be interpreted as limiting the invention to those media. The system and method can be of use and provided through any type of telecommunications medium, including without limitation: (i) any mobile telephony network including without limitation GSM, 3GSM, 3 G, CDMA, WCDMA or GPRS, satellite phones or other mobile telephone networks or systems; (ii) any so-called WiFi apparatus normally used in a home or subscribed network, but also configured for use on a visited or non-home or non-accustomed network, including apparatus not dedicated to telecommunications such as personal computers, Palm-type or Windows Mobile devices; (iii) an entertainment console platform such as Sony Playstation, PSP or other apparatus that are capable of sending and receiving telecommunications over home or non-home networks, or even (iv) fixed-line devices made for receiving communications, but capable of deployment in numerous locations while preserving a persistent user id such as the eye2eye devices from Dlink; or telecommunications equipment meant for voice over IP communications such as those provided by Vonage or Packet8.

In describing certain embodiments of the system under the present invention, this specification follows the path of a telecommunications call, from a calling party to a called party. For the avoidance of doubt, such a call can be a normal voice call, in which the user telecommunications equipment is also capable of visual, audiovisual or motion-picture display. Alternatively, those devices or calls can be for text, video, pictures or other communicated data.

In the foregoing specification, specific embodiments of the present invention have been described. However, one of ordinary skill in the art will appreciate that various modifications and changes can be made without departing from the scope of the present invention as set forth in the claims below. Accordingly, the specification and the figures are to be regarded in an illustrative rather than a restrictive sense, and all such modifications are intended to be included within the scope of present invention. The benefits, advantages, solutions to problems, and any element(s) that may cause any benefit, advantage, or solution to occur, or to become more pronounced, are not to be construed as a critical, required, or essential feature or element of any or all of the claims.

APPENDIX

| Acronym | Description |
| --- | --- |
| 3G | Third generation of mobile |
| ACM | ISUP Address Completion Message |
| ANM | ISUP Answer Message |
| ANSI-41 | American National Standards Institute #41 |
| ATI | Any Time Interrogation |
| BCSM | Basic Call State Model |
| BSC | Base Station Controller |
| BOIC | Barring Outgoing International Calls |
| BOIC-EX-Home | Barring Outgoing International Calls except to home country |
| CAMEL | Customized Application for Mobile Enhanced Logic |
| CAP | Camel Application Part |
| CB | Call Barring |
| CC | Country Code |
| CDMA | Code Division Multiplexed Access |
| CdPA | Called Party Address |
| CDR | Call Detail Record |
| CF | Call Forwarding |
| CgPA | Calling Party Address |
| CIC | Circuit Identification Code |
| CLI | Calling Line Identification |
| CSD | Circuit Switched Data |
| CSI | Camel Subscription Information |
| DPC | Destination Point Code |
| DSD | Delete User Data |
| DTMF | Dual Tone Multi-Frequency |
| ERB | CAP Event Report Basic call state model |
| EU | European Union |
| FPMN | Friendly Public Mobile Network |
| FTN | Forward-To-Number |
| GLR | Gateway Location Register |
| GGSN | Gateway GPRS Support Node |
| GMSC | Gateway MSC |
| GMSC-F | GMSC in FPMN |
| GMSC-H | GMSC in HPMN |
| GPRS | General Packet Radio System |
| GSM | Global System for Mobile |
| GSMA | GSM Association |
| GSM SSF | GSM Service Switching Function |
| GsmSCF | GSM Service Control Function |
| GT | Global Title |
| GTP | GPRS Tunnel Protocol |
| HLR | Home Location Register |
| HPMN | Home Public Mobile Network |
| IN | Intelligent Network |
| IOT | Inter-Operator Tariff |
| GTT | Global Title Translation |
| IAM | Initial Address Message |
| IDP | Initial DP IN/CAP message |
| IDD | International Direct Dial |
| IMSI | International Mobile User Identity |
| IMSI-H | HPMN IMSI |
| IN | Intelligent Network |
| INAP | Intelligent Network Application Part |
| INE | Interrogating Network Entity |
| IP | Internet Protocol |
| IREG | International Roaming Expert Group |
| IRS | International Revenue Share |
| ISC | International Service Carrier |
| ISD | MAP Insert User Data |
| ISG | International Signal Gateway |
| IST | Immediate Service Termination |
| ISTP | International STP |
| ISTP-F | ISTP connected to FPMN STP |
| ISTP-H | ISTP connected to HPMN STP |
| ISUP | ISDN User Part |
| ITPT | Inbound Test Profile Initiation |
| ITR | Inbound Traffic Redirection |
| IVR | Interactive Voice Response |
| LU | Location Update |
| LUP | MAP Location Update |
| MAP | Mobile Application Part |
| MCC | Mobile Country Code |
| MCC | Mobile Country Code |
| MD | Missing Data |
| ME | Mobile Equipment |
| MGT | Mobile Global Title |
| MMS | Multimedia Message Service |
| MMSC | Multimedia Message Service Center |
| MMSC-F | FPMN MMSC |
| MMSC-H | HPMN MMSC |
| MNC | Mobile Network Code |
| MNP | Mobile Number Portability |
| MO | Mobile Originated |
| MOS | Mean Opinion Score |
| MS | Mobile Station |
| MSC | Mobile Switching Center |
| MSISDN | Mobile Station International User Directory Number |
| MSISDN-F | FPMN MSISDN |
| MSISDN-H | HPMN MSISDN |
| MSRN | Mobile Station Roaming Number |
| MSRN-F | FPMN MSRN |
| MSRN-H | HPMN MSRN |

APPENDIX-continued

| Acronym | Description |
|---|---|
| MT | Mobile Terminated |
| MTP | Message Transfer Part |
| NDC | National Dialing Code |
| NP | Numbering Plan |
| NPI | Numbering Plan Indicator |
| NRTRDE | Near Real Time Roaming Data Exchange |
| O-CSI | Originating CAMEL Subscription Information |
| OCN | Original Called Number |
| ODB | Operator Determined Barring |
| OPC | Origination Point Code |
| OR | Optimal Routing |
| ORLCF | Optimal Routing for Late Call Forwarding |
| OTA | Over The Air |
| OTPI | Outbound Test Profile Initiation |
| PDP | Protocol Data Packet |
| PDN | Packet Data Network |
| PDU | Packet Data Unit |
| PRN | MAP Provide Roaming Number |
| PSI | MAP Provide User Information |
| QoS | Quality of Service |
| RAEX | Roaming Agreement EXchange |
| RI | Routing Indicator |
| RIS | Roaming Intelligence System |
| RDN | Redirecting Number |
| RNA | Roaming Not Allowed |
| RR | Roaming Restricted due to unsupported feature |
| RRB | CAP Request Report Basic call state model |
| RSD | Restore Data |
| RTP | Real-Time Transport Protocol |
| SAI | Send Authentication Info |
| SC | Short Code |
| SCA | Smart Call Assistant |
| SCCP | Signal Connection Control part |
| SCP | Signaling Control Point |
| SF | System Failure |
| SG | Signaling Gateway |
| SGSN | Serving GPRS Support Node |
| SGSN-F | FPMN SGSN |
| SIM | User Identity Module |
| SIGTRAN | Signaling Transport Protocol |
| SME | Short Message Entity |
| SM-RP-UI | Short Message Relay Protocol User Information |
| SMS | Short Message Service |
| SMSC | Short Message Service Center |
| SMSC-F | FPMN SMSC |
| SMSC-H | HPMN SMSC |
| SoR | Steering of Roaming |
| SPC | Signal Point Code |
| SRI | MAP Send Routing Information |
| SRI-SM | MAP Send Routing Information For Short Message |
| SS | Supplementary Services |
| SS7 | Signaling System #7 |
| SSN | Sub System Number |
| SSP | Service Switch Point |
| STK | SIM Tool Kit Application |
| STP | Signal Transfer Point |
| STP-F | FPMN STP |
| STP-H | HPMN STP |
| TADIG | Transferred Account Data Interchange Group |
| TAP | Transferred Account Procedure |
| TCAP | Transaction Capabilities Application Part |
| VT-CSI | Visited Terminating CAMEL Service Information |
| TP | SMS Transport Protocol |
| TR | Traffic Redirection |
| TS | Traffic Steering |
| TE | Termination Ecosystem |
| TT | Translation Type |
| UD | User Data |
| UDH | User Data Header |
| UDHI | User Data Header Indicator |
| USSD | Unstructured Supplementary Service Data |
| VAS | Value Added Service |
| VIP | Very Important Person |
| VLR | Visited Location Register |
| VLR-F | FPMN VLR |
| VLR-H | HPMN VLR |
| VLR-V | VPMN VLR |
| VMSC | Visited Mobile Switching Center |

APPENDIX-continued

| Acronym | Description |
|---|---|
| VoIP | Voice over IP |
| VPMN | Visited Public Mobile Network |
| ATI | Access Transport Information |
| UDV | Unexpected Data Value |
| USI | User Service Information |
| WAP | Wireless Access Protocol |

Technical References, the Entirety of Each of Which is Incorporated by Reference Herein:
GSM 902 on MAP specification
Digital cellular telecommunications system (Phase 2+)
Mobile Application Part (MAP) Specification
(3GPP TS 09.02 version 7.9.0 Release 1998)
GSM 340 on SMS
Digital cellular telecommunications system (Phase 2+)
Technical realization of the Short Message Service (SMS)
(GSM 03.40 version 7.4.0 Release 1998)
GSM 378 on CAMEL,
GSM 978 on CAMEL Application Protocol,
GSM 379 on CAMEL Support of Optimal Routing (SOR),
GSM 318 on CAMEL Basic Call Handling
ITU-T Recommendation Q.1214 (1995), Distributed functional plane for intelligent network CS-1,
ITU-T Recommendation Q.1218 (1995), Interface Recommendation for intelligent network CS-1,
ITU-T Recommendation Q.762 (1999), Signaling system No. 7—ISDN user part general functions of messages and signals,
ITU-T Recommendation Q.763 (1999), Signaling system No. 7—ISDN user part formats and codes,
ITU-T Recommendation Q.764 (1999), Signaling system No. 7—ISDN user part signaling procedures,
ITU-T Recommendation Q.765 (1998), Signaling system No. 7—Application transport mechanism,
ITU-T Recommendation Q.766 (1993), Performance objectives in the integrated services digital network application,
ITU-T Recommendation Q.769.1 (1999), Signaling system No. 7—ISDN user part enhancements for the support of Number Portability.

The invention claimed is:

1. A trading exchange system, the system comprising:
an ecosystem of a plurality of operators, having a plurality of home network (HPMN) and visited network (VPMN) operators;
a gateway for facilitating local data services for a user of a plurality of users by configuring a Domain Name Resolution (DNS) of a Gateway General Packet Radio System (GPRS) Support Node (GGSN) in the VPMN to resolve home destined Access Point Names (APNs) of the user to point to a GGSN or a packet data network gateway (PGW) of the gateway such that the VPMN is configured to enable roaming services for the user based on an unmodified APN profile, wherein the user is roaming in the VPMN over existing roaming relationship between the VPMN and the HPMN; and
an interface maintaining a bi-directional connection with the gateway to exchange information related to the roaming services, and a bi-directional connection with the user via an interface of a mobile device of the user.

2. The system of claim 1, wherein the gateway is a cloud based electronic trading service platform that establishes connections with the plurality of HPMNs and VPMNs, the HPMNs and VPMNs being part of the ecosystem, and their users being registered at the gateway.

3. The system of claim 1, wherein the interface interacts with the gateway using one or more of a bidirectional IP interface, WiFi, Cellular data, Unstructured Supplementary Service Data (USSD), and Short Message Service (SMS) channel, wherein either one of the interface and the gateway initiates a request or push notification.

4. The system of claim 1, wherein the gateway facilitates VPMN's DNS on IMS APN to point to VPMN GGSN/PGW instead of gateway's GGSN/PGW.

5. The system of claim 1, wherein the interface is one or more of a mobile application, a web interface and a desktop interface.

6. The system of claim 1, wherein the interface enables the user to trade data packages from the VPMN, without changing a User Identity Module (SIM) of the user.

7. The system of claim 6, wherein the data service is activated based on user preferences as one of automatic, on-demand, threshold triggered, and top-up alert triggered.

8. The system of claim 6, wherein the data service is selected for a specific VPMN operator, the user being steered for roaming to this specific VPMN operator.

9. The system of claim 1, wherein the interface is downloadable from an application store maintained by the trading exchange system.

10. The system of claim 1, wherein the interface enables payments related to sale or purchase of data packages, using at least one of mobile wallet, PayPal, Credit Cards, Debit Card, wire transfers, Near Field Communications (NFC) payments, WePay, Alipay, Pay™, and online payment systems.

11. The system of claim 1, wherein the trading exchange system further facilitates trade of un-used data packages from users.

12. The system of claim 1, wherein the trading exchange system facilitates the roaming data services of at least one of international and national roaming.

13. The system of claim 1, wherein the trading exchange system charges a transaction fee from the plurality of operators that exchange roaming data packages for the users.

14. The system of claim 1, wherein the trading exchange system further facilitates auctioning of data packages between buyers and sellers.

15. The system of claim 1, wherein the trading exchange system further facilitates application based charging model in roaming data packages.

16. The system of claim 1, wherein the trading exchange system further facilitates the operators to offer local numbers for roaming users for voice operations and messaging services, wherein the voice operations and messaging services are routed over IP established over data session.

17. The system of claim 1, wherein the interface is integrated with an application from one or more enterprises, in order to facilitate publishing of advertisements from the enterprises.

18. The system of claim 17, wherein the enterprises are at least one of airline, hotel, car rental, tourist business, shopping and restaurants.

19. The system of claim 1, wherein the trading exchange system further facilitates analytics of data from users' usage of the data packages.

20. The system of claim 1, wherein the data services are enabled only for those roaming users that have a valid registration with VPMN.

21. The system of claim 1, wherein the data services are enabled even when the users changes his SIM or changes his mobile number using mobile number portability.

22. The system of claim 21, wherein the interface manages multiple SIMs, and switches accounts as sellers or buyers for the corresponding SIMs.

23. The system of claim 1, wherein the interface facilitates automatic selection of data services for users based on user specified criteria.

24. The system of claim 1, wherein the trading exchange system further facilitates the data services for M2M or IOT devices.

25. The system of claim 1, wherein the HPMN and VPMN do not have a roaming relationship and the HPMN uses SoR to evade the VPMN.

26. The system of claim 25, wherein the interfaces enables only roaming data services from the VPMN without enabling any voice or messaging services.

27. The system of claim 1, wherein the communication exchange system facilitates the roaming data services using multi-IMSI SIM.

28. A method of facilitating local data services for users, the method comprising:
  receiving a local update message of users at a gateway, the gateway being a trading exchange system having an ecosystem of a plurality of operators, having a plurality of home network (HPMN) and visited network (VPMN) operators;
  configuring, by the gateway, a Domain Name Resolution (DNS) of a Gateway General Packet Radio System (GPRS) Support Node (GGSN) in the VPMN to resolve home destined Access Point Names (APNs) of the users to point to a GGSN or a packet data network gateway (PGW) of the gateway such that the VPMN is configured to enable roaming services for the user based on an unmodified APN profile, wherein the users are roaming in the VPMN, the local data services being enabled via an interface that maintains a bi-directional connection with the gateway and a user interface of mobile devices of the users.

29. The method of claim 28, wherein the gateway is a cloud based electronic trading service platform that establishes connections with the plurality of HPMNs and VPMNs, the HPMNs and VPMNs being part of the ecosystem, and their users being registered at the gateway.

30. The method of claim 28, wherein the interface interacts with the gateway using one or more of a bidirectional IP interface, WiFi, Cellular data, USSD, and SMS channel, wherein either one of the interface and the gateway initiates a request or push notification.

* * * * *